(12) United States Patent  
Obuchi

(10) Patent No.: US 9,499,169 B2  
(45) Date of Patent: Nov. 22, 2016

(54) DRIVING ASSISTANCE DEVICE

(71) Applicant: TOYOTA JIDOSHA KABUSHIKI KAISHA, Toyota-shi, Aichi-ken (JP)

(72) Inventor: Masashi Obuchi, Gotemba (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 281 days.

(21) Appl. No.: 14/489,775

(22) Filed: Sep. 18, 2014

(65) Prior Publication Data

US 2015/0088382 A1  Mar. 26, 2015

(30) Foreign Application Priority Data

Sep. 20, 2013 (JP) ................................. 2013-196057

(51) Int. Cl.

| | |
|---|---|
| *B60W 30/16* | (2012.01) |
| *B60W 30/14* | (2006.01) |
| *B62D 6/00* | (2006.01) |
| *B60K 31/00* | (2006.01) |
| *B62D 15/02* | (2006.01) |
| *G08G 1/16* | (2006.01) |

(52) U.S. Cl.

CPC .............. *B60W 30/16* (2013.01); *B60K 31/00* (2013.01); *B60W 30/143* (2013.01); *B62D 6/00* (2013.01); *B62D 15/026* (2013.01); *G08G 1/166* (2013.01); *G08G 1/167* (2013.01)

(58) Field of Classification Search

CPC .................. B60K 31/00; B62D 15/026; B62D 6/00; G08G 1/166; B60W 30/143; B60W 30/16

See application file for complete search history.

(56) References Cited

U.S. PATENT DOCUMENTS

| | | | | |
|---|---|---|---|---|
| 4,766,421 A | * | 8/1988 | Beggs ................... | G01S 7/4811 180/169 |
| 4,926,170 A | * | 5/1990 | Beggs ................... | G01S 7/4811 180/169 |

(Continued)

FOREIGN PATENT DOCUMENTS

| | | |
|---|---|---|
| JP | 2007-176290 A | 7/2007 |
| JP | 2012-133446 A | 7/2012 |

*Primary Examiner* — Mussa A Shaawat

(74) *Attorney, Agent, or Firm* — Sughrue Mion, PLLC

(57) ABSTRACT

A driving assistance device including: a preceding vehicle detection portion; a speed control portion controlling the speed adjustment to the host vehicle to obtain a target inter-vehicle distance; a preceding vehicle travel trajectory acquisition portion; an entering vehicle detection portion; an entering vehicle travel trajectory acquisition portion; a target trajectory setting portion setting the target travel trajectory of the host vehicle based on at least the travel trajectory of the preceding or the entering vehicle; a steer control portion controlling the adjustment of the steer amount calculated based on the target travel trajectory; and a location determination portion determining the location where the deviation amount between the travel trajectories of the entering and preceding vehicles becomes the predetermined value or below. The target trajectory setting portion sets the target travel trajectory of the host vehicle based on the travel trajectory of the entering vehicle, after the determined location.

14 Claims, 14 Drawing Sheets

(56) References Cited

U.S. PATENT DOCUMENTS

| | | | | |
|---|---|---|---|---|
| 5,761,629 A | * | 6/1998 | Gilling | B60K 31/0008 180/169 |
| 6,282,483 B1 | * | 8/2001 | Yano | B60K 31/0008 340/435 |
| 2003/0205867 A1 | * | 11/2003 | Coelingh | B60G 17/018 280/5.5 |
| 2003/0225494 A1 | * | 12/2003 | Coelingh | B60G 17/0195 701/48 |
| 2003/0225495 A1 | * | 12/2003 | Coelingh | B60G 17/0195 701/48 |
| 2003/0225496 A1 | * | 12/2003 | Coelingh | B60G 17/0195 701/48 |
| 2006/0235590 A1 | * | 10/2006 | Bolourchi | B62D 7/159 701/41 |
| 2010/0037072 A1 | * | 2/2010 | Nejah | G06F 1/1632 713/310 |
| 2011/0106391 A1 | * | 5/2011 | Shida | B60W 30/165 701/96 |
| 2011/0251768 A1 | * | 10/2011 | Luo | B60W 30/12 701/70 |
| 2013/0226407 A1 | * | 8/2013 | Rentschler | G08G 1/166 701/41 |

* cited by examiner

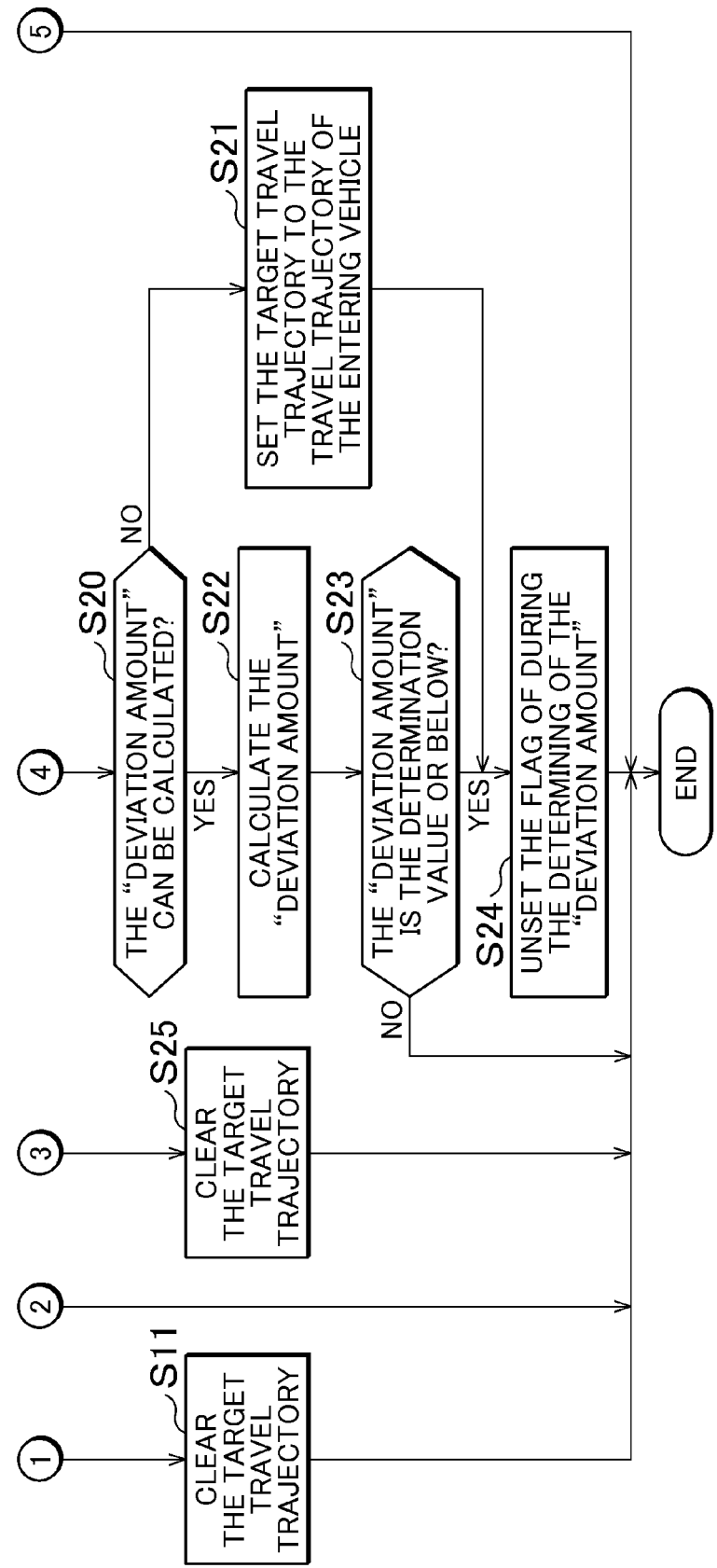

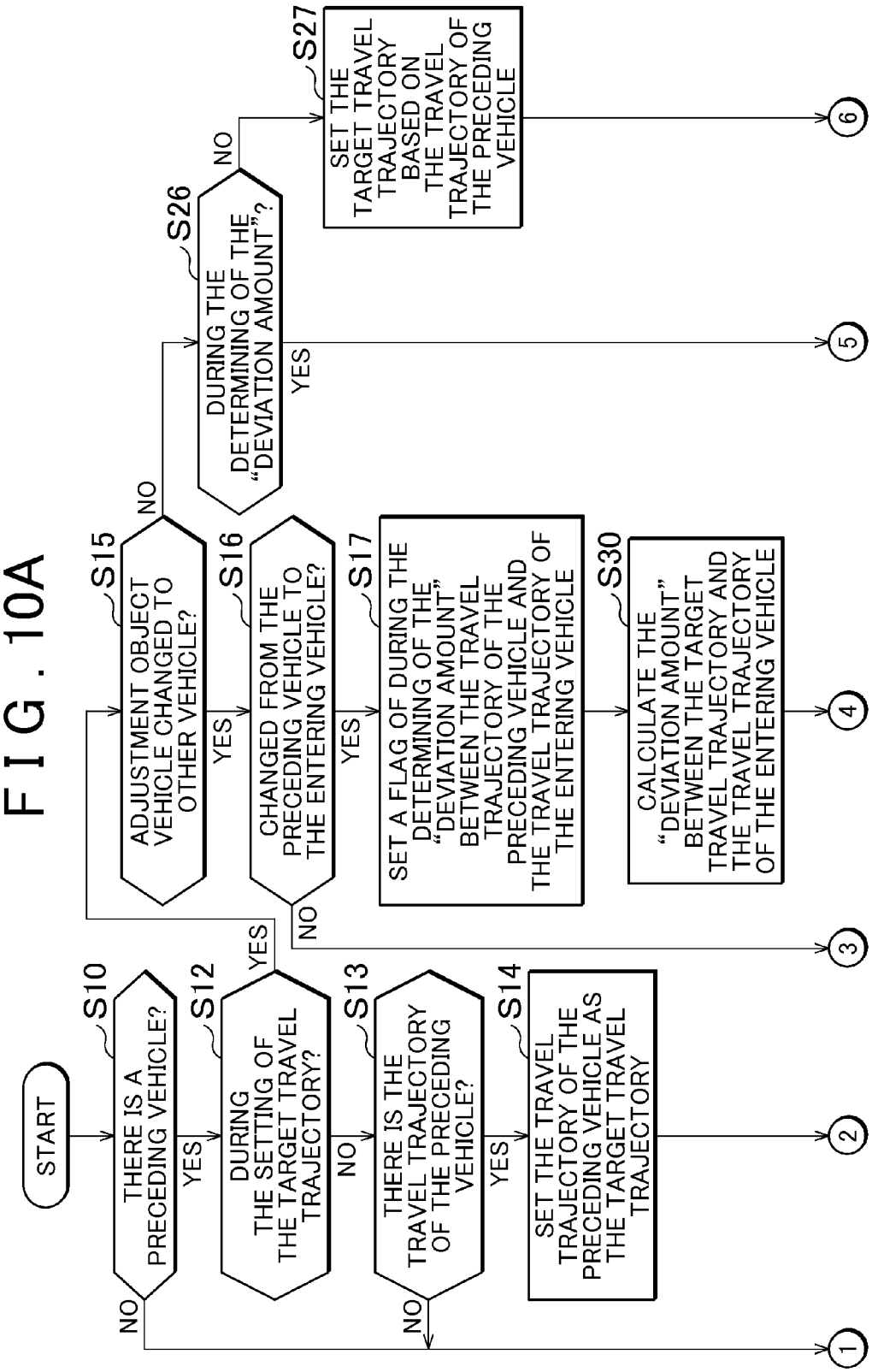

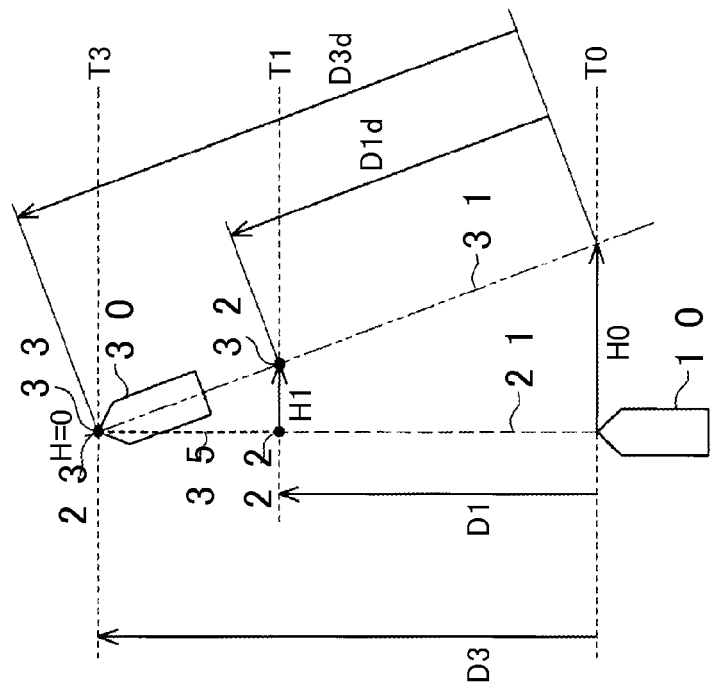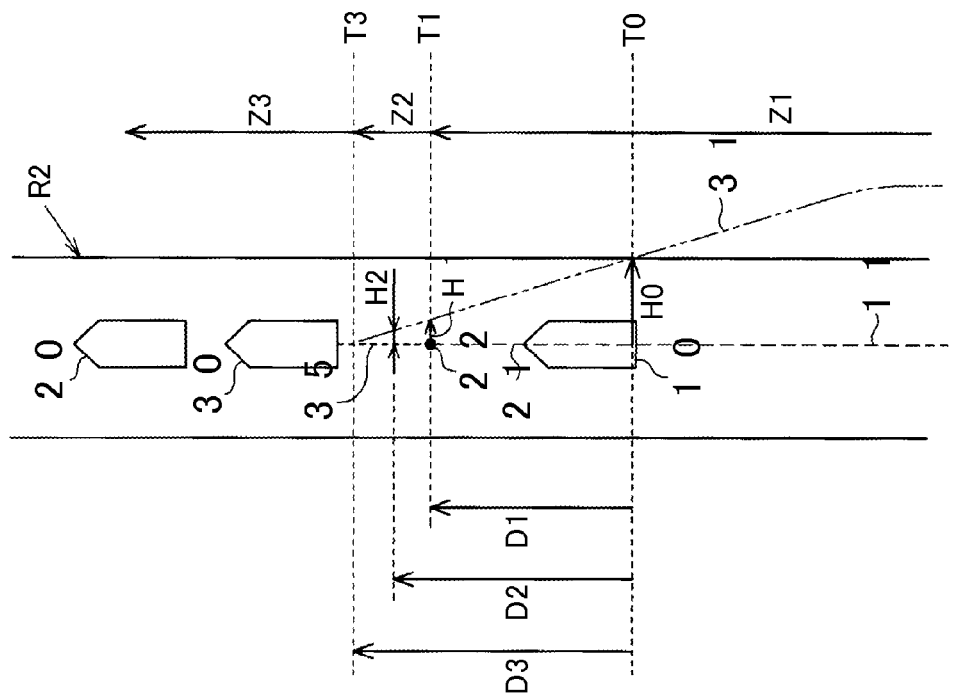

DRIVING ASSISTANCE DEVICE

INCORPORATION BY REFERENCE

The disclosure of Japanese Patent Application No. 2013-196057 filed on Sep. 20, 2013 including the specification, drawings and abstract is incorporated herein by reference in its entirety.

BACKGROUND OF THE INVENTION

1. Field of the Invention

The present disclosure relates to a driving assistance device that assist a vehicle in driving.

2. Description of Related Art

A driving assistance device is known as a device used to assist in keeping a safe inter-vehicle distance between a host vehicle as an assistance object and a preceding vehicle travelling in the travel direction of the host vehicle. When performing driving assistance, such a device can detect a relative position and a relative speed of an object in front of the vehicle's travel direction, thereby identifying the presence of a preceding vehicle. Moreover, the device performs an inter-vehicle control (speed control), to make the host vehicle follows the identified preceding vehicle. For example, Japanese Patent Application Publication No. 2007-176290 (JP 2007-176290 A) discloses an example relating to such a driving assistance device.

The driving assistance device disclosed in JP 2007-176290 A includes: host vehicle driving information detection means for detecting the host vehicle's travelling information; preceding vehicle information detection means for detecting the preceding vehicle information as travelling information of a preceding vehicle relative to the host vehicle. Also, the device includes steering control amount calculation means for calculating a control target value according to the positions of the preceding vehicle and the host vehicle, and calculates a steering control amount for following the preceding vehicle with a feedback control which is based on the control target value. Moreover, the driving assistance device also includes control gain setting means for temporarily decreasing the control gain of the feedback control when the preceding vehicle detection means detects that the preceding vehicle is switched. By such a configuration, an assistance to control an inter-vehicle distance between the host vehicle and the preceding vehicle is performed.

According to the driving assistance device disclosed in JP 2007-176290 A, when a vehicle enters between the host vehicle and the preceding vehicle, the control gain of the feedback control is decreased, thus, a sudden performing of a strong driving assistance caused by the entering vehicle mostly detected in a position near the host vehicle is restrained. Besides, by restraining the rapid change during the driving assistance, the uncomfortable feeling of the users brought by the assistance will be restrained.

Incidentally, the preceding vehicle switching detection of the driving assistance device etc. disclosed in JP 2007-176290 A is mostly performed by prioritizing maintaining a safe inter-vehicle distance; when the preceding vehicle is switched, sometimes, large deviation will remain between a travel trajectory of the preceding vehicle before switching and a travel trajectory of the preceding vehicle after switching in a width direction of the host vehicle. Therefore, due to the switching of the preceding vehicle, even if the control gain decreases, it is concerned that the driving position of the host vehicle greatly moves (unsteadiness) in the width direction of the host vehicle from the travel trajectory of the preceding vehicle before the detected switching to the travel trajectory of the preceding vehicle after switching.

SUMMARY OF THE INVENTION

The invention provides a driving assistance device, which restrains the moving (unsteadiness) of a host vehicle in a width direction even if an entering vehicle enters between the host vehicle and a preceding vehicle.

A first aspect of the invention is a driving assistance device that includes: a preceding vehicle detection portion that detects a preceding vehicle in front of a host vehicle in which the driving assistance device is disposed; a speed control portion that controls a speed adjustment of the host vehicle to make an inter-vehicle distance between the host vehicle and the preceding vehicle become a target inter-vehicle distance; a preceding vehicle travel trajectory acquisition portion that acquires a travel trajectory of the preceding vehicle; an entering vehicle detection portion that detects an entering vehicle which enters between the host vehicle and the preceding vehicle; an entering vehicle travel trajectory acquisition portion that acquires a travel trajectory of the entering vehicle detected by the entering vehicle detection portion; a target trajectory setting portion that sets a target travel trajectory of the host vehicle based on at least one of the travel trajectory of the preceding vehicle and the travel trajectory of the entering vehicle; a steering control portion that controls an adjustment of a steer amount of the host vehicle based on the target travel trajectory; and a location determination portion that determines a location where a deviation amount between the travel trajectory of the entering vehicle and the travel trajectory of the preceding vehicle becomes a predetermined value or below. The speed control portion sets the entering vehicle as the preceding vehicle of the speed control portion when the entering vehicle is detected by the entering vehicle detection portion, and the target trajectory setting portion sets the target travel trajectory of the host vehicle based on the travel trajectory of the preceding vehicle before entering of the entering vehicle at least until reaching the location determined by the location determination portion after the speed control portion sets the entering vehicle as the preceding vehicle, and sets the target travel trajectory of the host vehicle based on the travel trajectory of the entering vehicle after the location determined by the location determination portion.

A second aspect of the invention is a driving assistance device that includes: a preceding vehicle detection portion that detects a preceding vehicle in front of a host vehicle in which the driving assistance device is disposed; a speed control portion that controls a speed adjustment of the host vehicle to make an inter-vehicle distance between the host vehicle and the preceding vehicle becomes a target inter-vehicle distance; a preceding vehicle travel trajectory acquisition portion that acquires a travel trajectory of the preceding vehicle; an entering vehicle detection portion that detects an entering vehicle which enters between the host vehicle and the preceding vehicle; an entering vehicle travel trajectory acquisition portion that acquires a travel trajectory of the entering vehicle detected by the entering vehicle detection portion; a target trajectory setting portion that sets a target travel trajectory of the host vehicle based on at least one of the travel trajectory of the preceding vehicle and the travel trajectory of the entering vehicle; a steering control portion that controls an adjustment of a steer amount of the host vehicle based on the target travel trajectory; and a location determination portion, that determines a location where a deviation amount between the travel trajectory of the entering vehicle and the travel trajectory of the preceding vehicle becomes a predetermined value or below. The speed control portion sets the entering vehicle as the preceding vehicle of the speed control portion when the entering vehicle is detected by the entering vehicle detection portion, the location determination portion sets a value smaller than the deviation amount between the travel trajectory of the entering vehicle and the travel trajectory of the preceding vehicle at the location where the speed control portion sets the entering vehicle as the preceding vehicle as the predetermined value, and the target trajectory setting portion sets the target travel trajectory of the host vehicle based on the travel trajectory of the preceding vehicle before entering of the entering vehicle until reaching the location determined by the location determination portion, and sets the target travel trajectory of the host vehicle based on the travel trajectory of the entering vehicle after the location determined by the location determination portion.

A third aspect of the invention is a driving assistance device that performs a driving assistance of a host vehicle in which the driving assistance device is disposed based on a travelling state of other vehicle detected at surroundings of the host vehicle. The driving assistance device includes: a speed control portion that sets any one of a preceding vehicle which travels in front of the host vehicle, and an entering vehicle which enters between the host vehicle and the preceding vehicle as an adjustment object vehicle, and controls a speed adjustment of the host vehicle, to make an inter-vehicle distance between the set adjustment object vehicle and the host vehicle become a predetermined distance; a target trajectory setting portion that acquires a travel trajectory of the preceding vehicle and the travel trajectory of the entering vehicle respectively, sets any one travel trajectory of the acquired travel trajectories as an object trajectory, and sets the target travel trajectory as the travel target of the host vehicle based on the set object trajectory; a steering control portion that controls an adjustment of a steer amount of the host vehicle, based on the target travel trajectory set by the target trajectory setting portion; and a location determination portion that determines a location where a deviation amount between the travel trajectory of the entering vehicle and the travel trajectory of the preceding vehicle becomes a predetermined value or below. The target trajectory setting portion takes an event of setting the adjustment object vehicle as the entering vehicle and an event of setting the object trajectory as the travel trajectory of the preceding vehicle as conditions, and switches the setting of the object trajectory from the travel trajectory of the preceding vehicle to the travel trajectory of the entering vehicle at the location determined by the location determination portion.

According to the above aspects, since the setting of the target travel trajectory is switched from the travel trajectory of the preceding vehicle to the travel trajectory the of entering vehicle at the location where the deviation amount between the travel trajectory of the preceding vehicle and the travel trajectory of the entering vehicle becomes the predetermined value or below; therefore, at the switched location, the deviation amount generated on the target travel trajectory also becomes the predetermined value or below. Therefore, the deviation amount generated on the target travel trajectory is restrained, thus, the control that intends to move the host vehicle in the vehicle width direction, the so-called unsteadiness, is restrained by the steering control. That is, even if the entering vehicle is set as the preceding vehicle in the speed control, in the steering control, the travel trajectory of the preceding vehicle is set as the target travel trajectory until the location where the deviation amount between the travel trajectory of the preceding vehicle and the travel trajectory of the entering vehicle becomes the predetermined value or below, and the travel trajectory of the entering vehicle is set as the target travel trajectory after the location where the deviation amount becomes the predetermined value or below. Therefore, the switch timing needed by the speed control (inter-vehicle distance control) and the switch timing needed by the steering control (travel trajectory control) can be suitably set. That is, the switch timing of the steer assistance is set when the travel position of the host vehicle reaches the location where the deviation amount becomes the predetermined value or below. In addition, since the control gain relating the steering control may not be reduced when switching the travel trajectory of the preceding vehicle and the travel trajectory of the entering vehicle, thus, there is no concern that the responsibility of the steering control reduces temporarily.

In the driving assistance device, the entering vehicle detection portion may detect the entering vehicle, at least based on the event that the interval between the target travel trajectory of the host vehicle and the vehicle body of the entering vehicle in a direction perpendicular to a travel direction of the host vehicle becomes a predetermined interval or below, and the predetermined value may be a value smaller than the predetermined interval in the direction perpendicular to the travel direction of the host vehicle.

In the driving assistance device, the speed control portion may switch the adjustment object vehicle from the preceding vehicle to the entering vehicle, at least based on an event that an interval between the target travel trajectory of the host vehicle and a vehicle body of the entering vehicle in a direction perpendicular to the travel direction of the host vehicle becomes the predetermined interval or below, and the predetermined value may be a value smaller than the predetermined interval in a direction perpendicular to the travel direction of the host vehicle.

According to the above configurations, the speed regulation regulated on the basis of the vehicle width and the lane width, and the steer amount regulation regulated on the basis of the target travel trajectory set on the basis of one point in the vehicle width direction are respectively switched under suitable situations based on these. Moreover, the predetermined interval may be determined based on the width of the vehicle body of the host vehicle, and the lane width where the host vehicle travels, etc.

In the driving assistance device, the location determination portion may obtain the deviation amount as a distance in a straight line which intersects with the travel trajectory of the preceding vehicle and the travel trajectory of the entering vehicle. According to this configuration, based on the straight line which intersects with the travel trajectory of the preceding vehicle and the travel trajectory of the entering vehicle, the calculation of the deviation amount is easy.

In the driving assistance device, the location determination portion may use the intersecting straight line that is perpendicular to any one of the travel trajectory of the preceding vehicle and the travel trajectory of the entering vehicle. According to this configuration, based on the straight line perpendicular to any one of the travel trajectory of the preceding vehicle and the travel trajectory of the entering vehicle, the calculation of the deviation is easy.

In the driving assistance device, it may further include a travel trajectory presuming portion that obtains a presuming travel trajectory that is presumed as the travel trajectory of the preceding vehicle. The location determination portion may use the presuming travel trajectory of the preceding vehicle as the travel trajectory of the preceding vehicle further after the location where the travel trajectory of the preceding vehicle cannot be acquired.

According to this configuration, even when the travel trajectory of the preceding vehicle cannot be acquired, the steering control is performed to follow the presuming travel trajectory of the preceding vehicle until reaching the location where the deviation amount between the presuming travel trajectory of the preceding vehicle and the travel trajectory of the entering vehicle becomes the predetermined value or below, it is capable to restrain the move of the host vehicle with respect to the deviation between the presuming travel trajectory of the preceding vehicle and the travel trajectory of the entering vehicle (reduce the unsteadiness).

In the driving assistance device, the travel trajectory presuming portion may obtain the travel trajectory approaching ratio of the travel trajectory of the entering vehicle with respect to the travel trajectory that can be acquired as the travel trajectory of the preceding vehicle, and obtains the presuming travel trajectory based on the obtained approaching ratio and the travel trajectory of the entering vehicle.

According to this configuration, even if when the travel trajectory of the preceding vehicle cannot be acquired, using the presuming travel trajectory presumed as the travel trajectory of the preceding vehicle based on the travel trajectory of the entering vehicle, the deviation amount with respect to the travel trajectory of the entering vehicle can be calculated and the location where the deviation amount becomes the predetermined value or below can be determined.

In the driving assistance device, the travel trajectory presuming portion may obtain a distance from the travel trajectory of the preceding vehicle and the travel trajectory of the entering vehicle as an inter-trajectory distance at the position where the travel trajectory of the preceding vehicle is acquired, and calculates the presuming travel trajectory by reducing the obtained inter-trajectory distance based on the approaching ratio of the travel trajectory of the entering vehicle.

According to this configuration, since the travel trajectory of the preceding vehicle is presumed based, on the approaching ratio of the entering vehicle, thus, the presumed presuming travel trajectory has high continuity with respect to the travel trajectory of the entering vehicle.

In the driving assistance device, the travel trajectory presuming portion may obtain the presuming travel trajectory based on at least one of the travel trajectory of an adjacent vehicle travels on a lane adjacent to the lane where the host vehicle travels, and a shape of a travel route in which the host vehicle travels.

According to this configuration, the presuming travel trajectory can be presumed using the travel trajectory of the preceding adjacent vehicle. In addition, the presuming travel trajectory can be presumed based on the area where the vehicle can travel defined by the lanes on the road in which the area is the travel route. In addition, the presuming accuracy can be improved by using a plurality of information to presume the presuming travel trajectory.

In the driving assistance device, the steering control portion may assist the host vehicle to move to a lane width direction opposite to an entering direction of the entering vehicle when it is determined that it is difficult to acquire the travel trajectory of the preceding vehicle due to an effect of the entering vehicle.

According to this configuration, since it is capable of delaying the timing that the entering vehicle overlaps with the range needed by the host vehicle for detecting the preceding vehicle or reducing the overlapping, thus, even the entering vehicle enters, the travel trajectory of the preceding vehicle can be acquired as long as possible. Specifically, when the entering vehicle is a large vehicle, there is a high possibility that the host vehicle cannot acquire the travel trajectory of the preceding vehicle; however, the host vehicle can acquire the travel trajectory of the preceding vehicle longer than usual.

In the driving assistance device, the steering control portion may determine that it is difficult to acquire the travel trajectory of the preceding vehicle due to the effect of the entering vehicle when the entering vehicle enters the width occupied by the host vehicle when travelling in a direction perpendicular to the travel direction of the host vehicle.

According to such a configuration, when the entering vehicle enters, moving the host vehicle moves with allowance, thus, the uncomfortable feeling of the user brought by the assistance of acquiring the trajectory of the preceding vehicle is decreased.

In the driving assistance device, the steering control portion may end assisting the host vehicle to move to the lane width direction opposite to the entering direction of the entering vehicle when the location determination portion determines the location where the deviation amount becomes the predetermined value or below.

According to the above configuration, a driving assistance is provided in which when it is not necessary to use the travel trajectory of the preceding vehicle for the target travel trajectory of the host vehicle, the travel route of the host vehicle returns to the target travel trajectory, and the uncomfortable feeling of the user is decreased.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIGS. 4A and 4B are flow charts illustrating the process steps of the target travel trajectory generation process of the driving assistance device.

FIGS. 10A and 10B are flow charts illustrating the operation/ending steps of the target travel trajectory generation process of the driving assistance device.

FIG. 15 is an illustration diagram illustrating the generation of the target travel trajectory of the driving assistance device.

FIG. 16 is an illustration diagram illustrating the generation of the target travel trajectory of the driving assistance device.

DETAILED DESCRIPTION OF EMBODIMENTS

The First Embodiment

The first embodiment which embodies the driving assistance device will be described as follows by reference to FIGS. 1~8.

Figure 1:
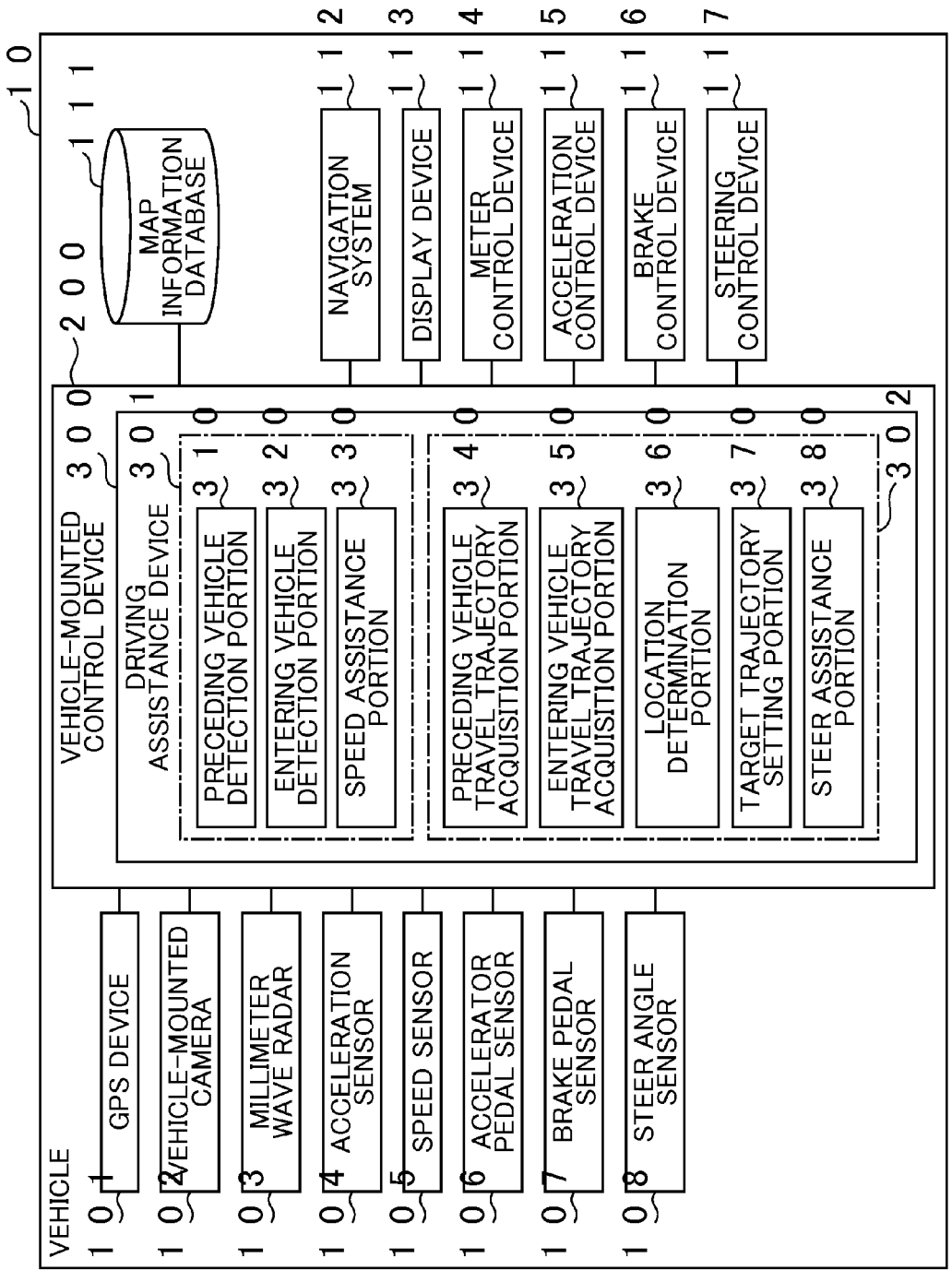
FIG. 1 is a block diagram illustrating the general configuration of the first embodiment which embodies the driving assistance device.

Firstly, a general configuration of the driving assistance device 300 is described. As illustrated in FIG. 1, the driving assistance device 300 is applied to a vehicle 10 such as an automobile etc. The driving assistance device 300 provides the vehicle 10 with a preceding vehicle following assistance, as a driving assistance, that includes preceding vehicle following control which makes the host vehicle travel following the preceding vehicle 20. In the vehicle 10 that travels following the preceding vehicle 20 based on the preceding vehicle following assistance, when an enterring vehicle 30 enters between the vehicle 10 and the preceding vehicle 20, the assistance object is switched from the preceding vehicle 20 to the entering vehicle 30 at an appropriate timing in the preceding vehicle following assistance.

Figure 5:
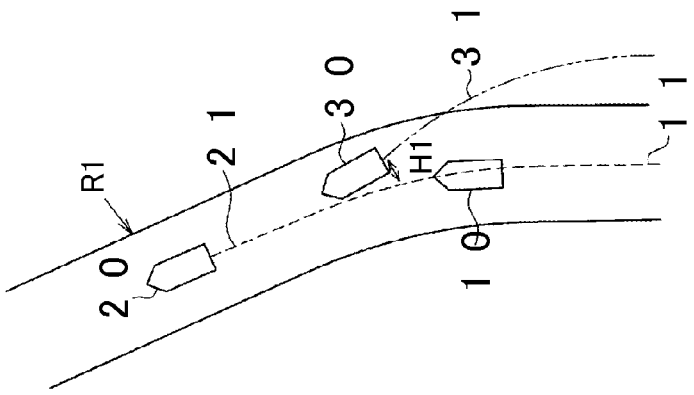
FIG. 5 is an illustration diagram illustrating the generation of the target travel trajectory of the driving assistance device.
Figure 6:
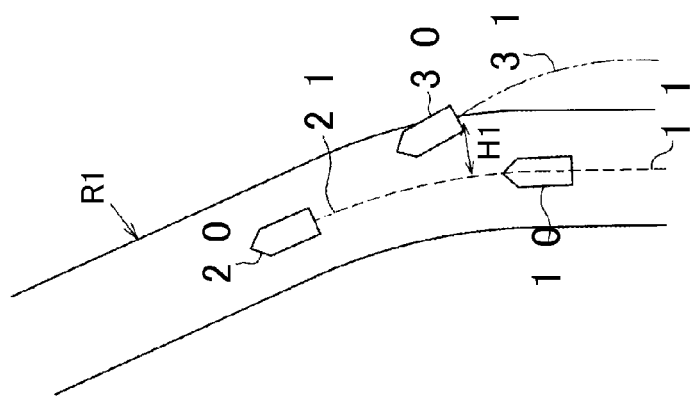
FIG. 6 is an illustration diagram illustrating the generation of the target travel trajectory of the driving assistance device.
Figure 7:
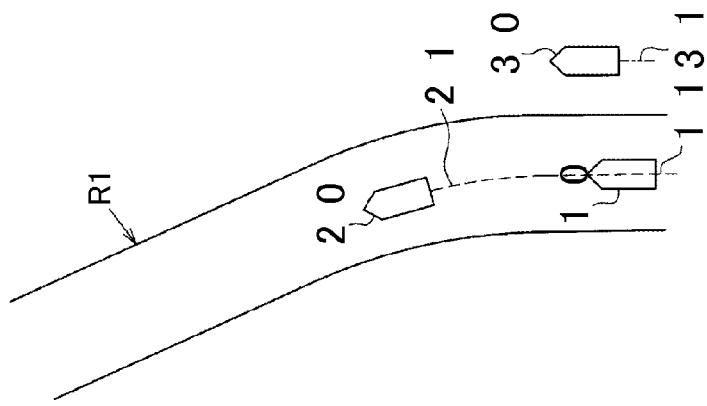
FIG. 7 is an illustration diagram illustrating the generation of the target travel trajectory of the driving assistance device.
Figure 8:
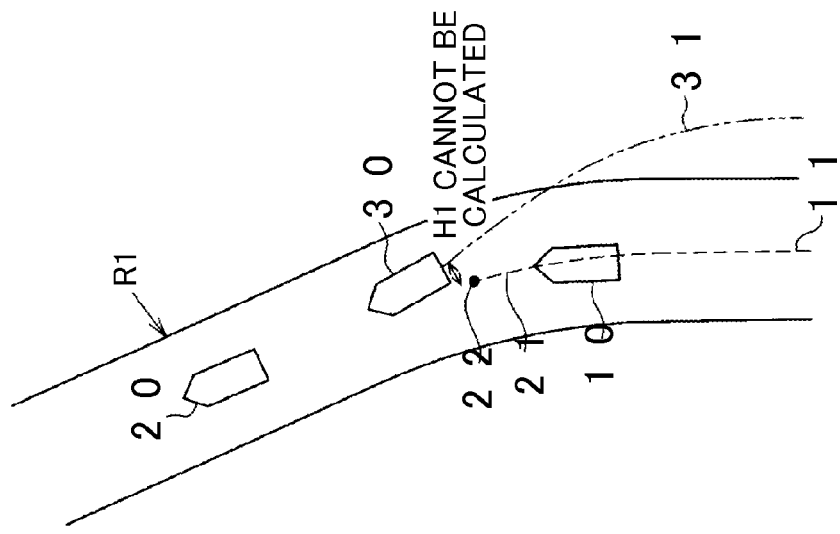
FIG. 8 is an illustration diagram illustrating the generation of the target travel trajectory of the driving assistance device.

A general configuration of the preceding vehicle following assistance is described by reference to FIGS. 5~8. As illustrated in FIG. 5, the vehicle 10 travels following the preceding vehicle 20, by performing inter-vehicle distance assistance and travel trajectory assistance, in which the inter-vehicle distance assistance includes inter-vehicle distance control that ensures a predetermined inter-vehicle distance, and the travel trajectory assistance includes travel trajectory control that ensures travelling along the target travel trajectory. At this time, as illustrated in FIG. 6, according to the event that the entering vehicle 30 enters between the vehicle 10 and the preceding vehicle 20 from the right front in the travel direction of the vehicle 10, the driving assistance device of the vehicle 10 switches the inter-vehicle distance adjustment object vehicle from the preceding vehicle 20 to the entering vehicle 30. On the other hand, the distance, namely "deviation amount H1", between the travel trajectory 21 of the preceding vehicle 20 and the travel trajectory 31 of the entering vehicle 30 is large. Therefore, if the target travel trajectory of the travel trajectory assistance is switched from the travel trajectory 21 of the preceding vehicle 20 to the travel trajectory 31 of the entering vehicle 30 at this position, the travel trajectory of the vehicle 10 will greatly vibrate in the direction of the entering vehicle 30, which is the so-called vehicle 10 is pulled into the direction of the entering vehicle 30. Therefore, as illustrated in FIGS. 6~8, the driving assistance device 300 calculates the "deviation amount H1" which changes with entering of the entering vehicle 30 at any time, and detects the location where the "deviation amount H1" becomes within a "determination value $\Delta h$". Then, the driving assistance device 300 performs travel trajectory assistance until the "deviation amount H1" becomes the "determination value $\Delta h$" or below, so as to travel along the travel trajectory 21 of the preceding vehicle 20; and performs travel trajectory assistance after the "deviation amount H1" becomes the "determination value $\Delta h$" or below, so as to travel along the travel trajectory 31 of the entering vehicle 30. In this way, the driving assistance device 300 adjusts the timing for switching the inter-vehicle distance adjustment object vehicle and the timing for switching the travel trajectory which becomes the object of the travel trajectory assistance to timings suitable to each assistance, respectively, thereby providing a preceding vehicle following assistance which restrains the movement (unsteadiness) of the host vehicle in the vehicle width direction.

Next, the configuration of the driving assistance device in this embodiment is described by reference to FIGS. 1-5. As illustrated in FIG. 1, the vehicle 10 includes a GPS device 101, a vehicle-mounted camera 102, a millimeter wave radar 103, an acceleration sensor 104, and a vehicle speed sensor 105, to detect the travel state of the vehicle 10. Besides, the vehicle 10 is also mounted with an accelerator pedal sensor 106, a brake pedal sensor 107, and a steer angle sensor 108 etc. The GPS device 101, the vehicle-mounted camera 102, the millimeter wave radar 103, the acceleration sensor 104, the vehicle speed sensor 105, the accelerator pedal sensor 106, the brake pedal sensor 107 and the steer angle sensor 108 are connected to a vehicle-mounted control device 200 which performs various vehicle controls via a vehicle-mounted network. Furthermore, as the vehicle-mounted network, a CAN (controller area network), etc may be used.

The GPS device 101 receives signals from GPS satellites and detects the position of the vehicle 10 as longitude and latitude based on the signals received from the GPS satellite. Then, the GPS device 101 outputs the detected position information that shows the position (longitude and latitude) of the vehicle 10 to the vehicle-mounted control device 200. As such, based on the position information, the vehicle-mounted control device 200 can obtain the required information of road and region from the map information database, or receive route guidance from a navigation system 112.

The vehicle-mounted camera 102 shoots photos of the surrounding environments of the vehicle 10 and outputs the shot image data to the vehicle-mounted control device 200. The images shot by the vehicle-mounted camera 102 include the images of lanes of the road on which the vehicle 10 travels, the road profile, the road facilities such as guard rails and side walls of the road, as well as other vehicles travelling in the surrounding area of the vehicle 10. In such other vehicles, images about the preceding vehicle 20 that travels in the front in the travel direction are included. Furthermore, in such other vehicles, images of the so-called entering vehicle 30 that changes its travel lane in front of the travelling vehicle 10 or enters between the vehicle 10 and the preceding vehicle 20 are included. The vehicle-mounted control device 200 detects the external circumstances, such as other vehicle travelling in the surrounding area of the vehicle 10, the relative position and relative speed of the other vehicle relative to the vehicle 10, the travel lane of the vehicle 10, and the adjacent lanes adjacent to the travel lane of the vehicle 10, based on the image identification process of the shot images.

The millimeter wave radar 103 detects the objects exist around the vehicle 10 using the electric wave of millimeter band, and outputs the signals corresponding to the detection result to the vehicle-mounted control device 200. The millimeter wave radar 103 can also detect vehicles that approach the vehicle 10. For example, the millimeter wave radar 103 can detect the preceding vehicle 20, and the entering vehicle 30 that enters towards the front of the vehicle 10, etc. Besides, since the difference between the speeds of the preceding vehicle 20, the entering vehicle 30 and the vehicle 10 is small, thus it is determined that they are vehicles. In the vehicle-mounted control device 200, the external circumstances are detected according to the detection result of the millimeter wave radar 103. For example, the vehicle-mounted control device 200 calculates the inter-vehicle distance between the vehicle 10 and the preceding vehicle 20 and the relative speed; or detects the entering vehicle 30 that approaches and is different from the preceding vehicle 20, and calculates the inter-vehicle distance between the vehicle 10 and the entering vehicle 30 as well as the relative speed.

The acceleration sensor 104 detects the acceleration of the vehicle 10 and outputs the signal corresponding to the detected acceleration to the vehicle-mounted control device 200. The vehicle-mounted control device 20 calculates the acceleration of the vehicle 10, based on the signal corresponding to the acceleration.

The speed sensor 105 detects the rotation speed of the wheels of the vehicle 10 and outputs a signal corresponding to the detected rotation speed to the vehicle-mounted control device 200. The vehicle-mounted control device 200 calculates the speed of the vehicle 10, based on the rotation speed.

The accelerator pedal sensor 106 detects the operation amount of the accelerator pedal performed by the driver, and outputs a signal corresponding to the detected operation amount of the accelerator pedal to the vehicle-mounted control device 200. The vehicle-mounted control device 200 calculates an acceleration of the vehicle 10, based on the operation amount of the accelerator pedal.

The brake pedal sensor 107 detects the operation amount of the brake pedal performed by the driver, and outputs a signal corresponding to the detected operation amount of the brake pedal to the vehicle-mounted control device 200. The vehicle-mounted control device 200 calculates a deceleration of the vehicle 10, based on the operation amount of the brake pedal.

The steer angle sensor 108 detects the steer angle of the steering and outputs a signal corresponding to the detected steer angle to the vehicle-mounted control device 200. The vehicle-mounted control device 200 calculates the travel direction of the vehicle 10, based on the steer angle.

The vehicle 10 includes a map information database 111 registered with map data. The map information database 111 is connected to the vehicle-mounted control device 200 such that the data can be read and written. Map data includes geography-related data, such as the road etc. In map data, data that can display geography and information relating to positions such as longitude and latitude are registered. The map information database 141 includes the locations of specific traffic factors such as crossroads, traffic lights and curves, as well as road information such as lane number, lane width, and curvature of the curve and slopes. In addition, various data such as road data that includes the type of the road, and crossroad data showing the crossroad information, etc. may also be included in the map information database 111.

The vehicle 10 includes a navigation system 112 and a display device 113. The navigation system 112 and the display device 113 are electrically connected to the vehicle-mounted control device 200.

The navigation system 112 acquires present location of the vehicle 10 (longitude and latitude) from the vehicle-mounted control device 200 in which the detection result of the GPS device 101 is input. Furthermore, the navigation system 112 searches for a travel route from the present position of the vehicle 10 to a destination, by referring the map information database 111. Furthermore, the navigation system 112 outputs information showing the searched travel route, moving time, etc. to the vehicle-mounted control device 200; and outputs to the display device 113 consisting of LCD display provided inside the vehicle body via the vehicle-mounted control device 200.

The vehicle 10 includes a meter control device 114 for controlling the display state of the meter displayed on an installment panel provided on a dash board. The meter control device 114 is electrically connected to the vehicle-mounted control device 200. The meter control device 114 acquires data that shows the vehicle speed, from the vehicle-mounted control device 200, and performs visible display of the vehicle speed based on the acquired data.

The vehicle 10 includes: an acceleration control device 115 for controlling the driving state of an engine; a brake control device 116 for controlling the acting state of the brake, and a steering control device 117 for controlling the steering state of the steering. The acceleration control device 115, the brake control device 116, and the steering control device 117 are electrically connected to the vehicle-mounted control device 200.

The acceleration control device 115 controls the driving state of the engine, based on a control amount calculated by the vehicle-mounted control device 200 according to the detection value of the accelerator pedal sensor 106. Furthermore, the acceleration control device 115 also can control the driving state of the engine, according to a control amount of the engine calculated by the vehicle-mounted control device based on the driving assistance.

The brake control device 116 controls the acting state of the brake, based on a control amount of the brake calculated by the vehicle-mounted control device 200 according to the detection value of the brake pedal sensor 107. Furthermore, the brake control device 116 can also control the acting state of the brake, based on a control amount of the brake calculated by the vehicle-mounted control device 200 according to the driving assistance.

The steering control device 117 controls the steering state of the steering, based on a control amount of the steer angle calculated by the vehicle-mounted control device 200 according to a detection value of the steer angle sensor 108. Furthermore, the steering control device 117 can also control the steering state of the steering, according to a control amount of the steer angle calculated by the vehicle-mounted control device 200 based on the driving assistance.

By such a configuration, for example, the signal used for adjusting speed from the vehicle-mounted control device 200 is input to the display device 113, thus, an indication relates to the acceleration/deceleration of the vehicle speed of the vehicle 10 can be displayed on the display device 113; or the signal is input to the acceleration control device 115, thus, the acceleration control device 115 can perform fine-tuning to the speed of the vehicle 10. Furthermore, for example, the signal used for adjusting brake from the vehicle-mounted control device 200 is input to the display device 113, thus, an indication relates to the brake operation of the vehicle 10 can be displayed on the display device 113; or the signal is input to the brake control device 116, thus, the brake control device 116 can decrease the speed of the vehicle 10. Furthermore, for example, the signal used for adjusting steering amount from the vehicle-mounted control device 200 is input to the display device 113, thus, an indication relates to the steering amount of the vehicle 10 can be displayed on the display device 113; or the signal is input to the steering control device 117, thus, the steering control device 117 can perform fine-tuning to the steer angle of the vehicle 10.

The vehicle-mounted control device 200 is a control device used for various controls of the vehicle 10, for example, the vehicle-mounted control device 200 is a control device that includes a driving system, a travelling system, a vehicle body system, or an information device system, etc. as the control objects. The vehicle-mounted control device 200 is the so-called ECU (electronic control unit), which is configured to include a micro computer with a calculation unit and a storage unit. The calculation unit is the so-call CPU etc., for performing calculation process of a control program. The storage unit includes Read Only Memory (ROM) storing the control program or data, and Random Access Memory (RAM) temporarily storing the calculation results of the calculation unit; and the storage unit is configured by including non-volatile memory medium such as hard disk or EEPROM such as flash memory for storing large amount of data. Therefore, the vehicle-mounted control device 200 reads the control program and various parameters storing in the storage unit to the calculation unit and performs operation process, thereby providing predetermined functions to the control object and performing control of the control object.

Figure 2:
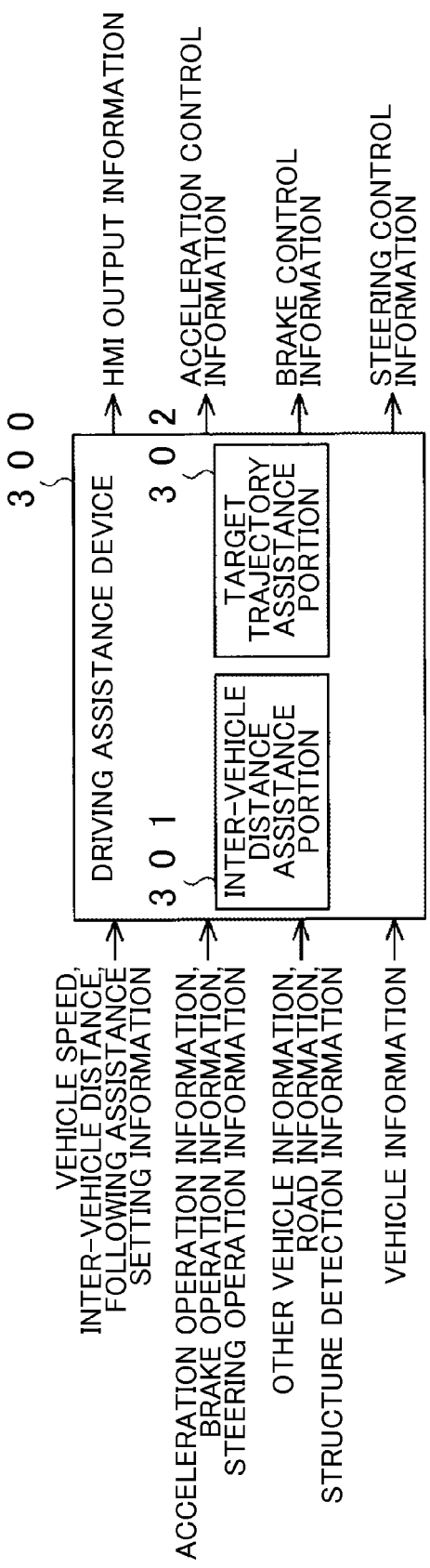
FIG. 2 is an illustration diagram schematically illustrating the configuration of the driving assistance device.

In this embodiment, the vehicle-mounted control device 200 includes a driving assistance device 300 for performing driving assistance. As illustrated in FIG. 2, the driving assistance device 300 is input with a signal relating to the driving assistance from the vehicle-mounted control device 200, and performs driving assistance relating to deceleration, acceleration and steering, etc., according to the input signal relating to the driving assistance. For example, the driving assistance device 300 is input with vehicle speed, inter-vehicle distance, following assistance setting information, acceleration operation information, brake operation information, steering operation information, information of other vehicles, road information, and structure detection information, etc., from the vehicle-mounted control device 200. Furthermore, the driving assistance device 300 outputs HMI (Human Machine Interface) information, acceleration control information, brake control information, and steering control information, etc.

The vehicle-mounted control device 200 is stored with a control program for achieving the functions of the driving assistance device 300, by performing the control program, the driving assistance device 300 is provided. Moreover, as parameters, various values such as "determination value Δh" are set as needed.

In this embodiment, the driving assistance device 300 performs a preceding vehicle following assistance which enables the vehicle 10 to travel by following the preceding vehicle 20. The preceding vehicle following assistance is an assistance performed by at least the combination of an inter-vehicle distance assistance which maintains an inter-vehicle distance between the vehicle 10 and the preceding vehicle 20, and a travel trajectory assistance which makes the vehicle 10 travel along the target travel trajectory (target travel route). Moreover, the inter-vehicle distance assistance includes speed adjustment assistance using the speed adjustment to regulate the error with respect to a target interval.

The driving assistance device 300 includes a preceding vehicle detection portion 310, an entering vehicle detection portion 320, a speed assistance portion 330 function as a speed control portion, a preceding vehicle travel trajectory acquisition portion 340, an entering vehicle travel trajectory acquisition portion 350, a target trajectory setting portion 370, a steer assistance portion 380 function as a steering control portion, and a location determination portion 360. The preceding vehicle detection portion 310, the entering vehicle detection portion 320, the speed assistance portion 330, the preceding vehicle travel trajectory acquisition portion 340, the entering vehicle travel trajectory acquisition portion 350, the target trajectory setting portion 370, the steer assistance portion 380 and the location determination portion 360 exhibit their functions by performing the control program of the vehicle-mounted control device 200.

The preceding vehicle detection portion 310 detects the preceding vehicle 20, inputs information such as the relative position and the relative speed with respect to other vehicle detected by the vehicle-mounted control device 200 using an image recognition process, determines the preceding vehicle 20 based on the above information, and calculates the inter-vehicle distance and relative speed with respect to the preceding vehicle 20.

The entering vehicle detection portion 320 detects the entering vehicle 30, inputs information such as the relative position and the relative speed with respect to other vehicle detected by the vehicle-mounted control device 200 using image recognition process, determines the entering vehicle 30 based on above information, and calculates the inter-vehicle distance and relative speed with respect to the entering vehicle 30. Specifically, the entering vehicle detection portion 320 detects the other vehicle as the entering vehicle 30, based on the event that an interval between the target travel trajectory and the body of the other vehicle falls within the predetermined interval. For example, whether the interval between the target travel trajectory and the entering vehicle 30 changes from a position where it is larger than a half equivalence of the width of the lane on which the vehicle 10 travels to a position where it is equals to or smaller than a half equivalence of the width of the lane on which the vehicle 10 travels can be detected.

In this embodiment, the vehicle 10 travels in a manner that the center in the vehicle width direction is along the target travel trajectory. Therefore, the predetermined interval is determined based on the width defined based on the vehicle 10, such as the vehicle body width of the vehicle 10, etc.; and the width defined based on the road, such as the lane width on which the vehicle 10 is travelling, to be able to detect the entering vehicle. For example, the predetermined interval is determined as being able to at least guarantee an interval of the vehicle body width of the vehicle 10 or above, that is a size of half of the vehicle body width or above. Moreover, the interval between the target travel trajectory of the vehicle 10 and the body of the entering vehicle 30 is preferably an interval perpendicular to a travel direction of the vehicle 10. Moreover, the entering vehicle detection portion 320 ends the detection of the detected entering vehicle 30, by setting the detected entering vehicle 30 as the preceding vehicle of the preceding vehicle following assistance, etc.

The speed assistance portion 330 assists the speed adjustment of the vehicle 10, so as to make the inter-vehicle distance between the adjustment object vehicle and the vehicle 10 a proper inter-vehicle distance, or make the speed a proper speed for maintaining a proper inter-vehicle distance or above, with respect to the adjustment object vehicle selected from any one of the preceding vehicle 20 and the entering vehicle 30. For example, the speed assistance portion 330 can control the speed adjustment of the vehicle 10 by transmitting the adjusted speed to the acceleration control device 115 and the brake control device 116. The speed assistance portion 330 usually selects the preceding vehicle 20 as the adjustment object vehicle; on the other hand, selects the entering vehicle 30 as the adjustment object vehicle according to the event that the entering vehicle 30 is detected. That is, the speed assistance portion 330 changes the adjustment object vehicle from the preceding vehicle 20 to the entering vehicle 30 according to the event that the entering vehicle 30 is detected, at this time point, in the speed assistance portion 330 selects the entering vehicle 30 before changing of the adjustment object vehicle as the "new preceding vehicle".

The preceding vehicle travel trajectory acquisition portion 340 acquires the travel trajectory 21 of the preceding vehicle 20, inputs information such as the relative position and the relative speed with respect to the other vehicle detected by the vehicle-mounted control device 200 using the image recognition process, as for the preceding vehicle 20 determined based on the above information, acquires the travel trajectory 21 of the preceding vehicle 20. The detection of the preceding vehicle 20 can be performed, for example, using the same process with the preceding vehicle detection portion 310.

The entering vehicle travel trajectory acquisition portion 350 acquires the travel trajectory 31 of the entering vehicle 30, inputs information such as the relative position and the relative speed with respect to the other vehicle detected by the vehicle-mounted control device 200 using the image recognition process, detects the entering vehicle 30 based on the above information, and acquires the travel trajectory 31 of the entering vehicle 30. The detection of the entering vehicle 30 can be performed, for example, using the same process with the entering vehicle detection portion 320.

Herein, the entering vehicle travel trajectory acquisition portion 350 may also acquire the travel trajectory of the other vehicle before the entering vehicle 30 is detected. The entering vehicle travel trajectory acquisition portion 350 may also selects one or more of the vehicles among the other vehicles which travel between the side of the vehicle 10 and the preceding vehicle 20 in the adjacent lane of the vehicle 10 as entering candidate vehicles that may become the entering vehicle 30, and acquires travel trajectories of these entering candidate vehicles. Moreover, setting the travel trajectory 31 of the entering vehicle 30 acquired by the entering vehicle travel trajectory acquisition portion 350 as the target travel trajectory of the preceding vehicle following assistance, etc., thus, the entering vehicle travel trajectory acquisition portion 350 ends the acquirement of the travel trajectory 31 of the entering vehicle 30, by making the preceding vehicle travel trajectory acquisition portion 340 inherits the acquirement.

The location determination portion 360 is input with the travel trajectory 21 of the preceding vehicle 20 acquired by the preceding vehicle travel trajectory acquisition portion 340, and is input with the travel trajectory 31 of the entering vehicle 30 acquired by the entering vehicle travel trajectory acquisition portion 350. The location determination portion 360 compares the travel trajectory 21 of the preceding vehicle 20 with the travel trajectory 31 of the entering vehicle 30, and determines a location where the travel trajectory 31 of the entering vehicle 30 approaches the travel trajectory 21 of the preceding vehicle 20 within a predetermined "determination value $\Delta h$". That is, the location determination portion 360 determines a location where the "deviation amount H1" between the travel trajectory 21 of the preceding vehicle 20 and the travel trajectory 31 of the entering vehicle 30 becomes the predetermined "determination value $\Delta h$" or below. The predetermined "determination value $\Delta h$" is a value with a degree of the following amount, for example, even the target travel trajectory is switched from the travel trajectory 21 of the preceding vehicle 20 to the travel trajectory 31 of the entering vehicle 30, the steering amount of the vehicle 10 can also restrain the discomfort feeling of the users.

That is, the "determination value $\Delta h$" is a value, in a direction perpendicular to the travel direction of the vehicle 10, smaller than the predetermined interval used by the entering vehicle detection portion 320 for detecting the entering vehicle 30. The target trajectory setting portion 370 is input with: the travel trajectory 21 of the preceding vehicle 20 acquired by the preceding vehicle travel trajectory acquisition portion 340; the travel trajectory 31 of the entering vehicle 30 acquired by the entering vehicle travel trajectory acquisition portion 350; and the location determined by the location determination portion 360. The target trajectory setting portion 370 usually sets the travel trajectory 21 of the preceding vehicle 20 acquired by the preceding vehicle travel trajectory acquisition portion 340 as the target travel trajectory. On the other hand, if the target trajectory setting portion 370 is input with the location determined by the location determination portion 360, the target trajectory setting portion 370 sets the target travel trajectory based on the travel trajectory 21 of the preceding vehicle 20 before the entering of the entering vehicle 30, until the input determined location; and after the input determined location, sets the target travel trajectory based on the travel trajectory 31 of the entering vehicle 30. That is, at the location where the distance between the travel trajectory 21 of the preceding vehicle 20 and the travel trajectory 31 of the entering vehicle 30, which is the "deviation amount H1" becomes the "determination value $\Delta h$" or below, the target trajectory setting portion 370 changes the travel trajectory which is set as the target travel trajectory from travel trajectory 21 of the preceding vehicle 20 to the travel trajectory 31 of the entering vehicle 30. Thus the set target travel trajectory enables the "deviation amount H1" of the trajectory generated at a determined location which is the joint of the travel trajectory 21 of the preceding vehicle 20 and the travel trajectory 31 of the entering vehicle 30 equal to or smaller than, for example, the "determination value Δh". That is, at the determined location, the target trajectory setting portion 370 changes the travel trajectory which is set as the target travel trajectory from the travel trajectory 21 of the preceding vehicle 20 to the trajectory 31 of the entering vehicle 30; at this position, the target trajectory setting portion 370 changes the object of the travel trajectory, which is set as the target travel trajectory, from the travel trajectory 21 of the preceding vehicle 20 before the entering of the entering vehicle 30 to the travel trajectory 31 of the entering vehicle 30.

The steer assistance portion 380 assists the adjustment to the steer amount of the vehicle 10, such that the travel trajectory of the vehicle 10 travels along the target travel trajectory; in other words, the vehicle 10 traces along the target travel trajectory. More specifically, the steer assistance portion 380 adjusts the steer amount, to make the vehicle 10 travel in a manner that the center in the vehicle width direction of the vehicle 10 is along the target travel trajectory. The steer assistance portion 380 transmits the information relating to the steer amount needed by the travel trajectory assistance of the vehicle 10 to users, or to the steering control device 117, based on the error between the travel position of the vehicle 10 and the target travel trajectory generated by the target trajectory setting portion 370. For example, the steer assistance portion 380 transmits the information relating to the adjusted steer amount to the steering control device 117, thereby being capable of controlling the adjustment to the steer amount.

Herein, in this embodiment, the inter-vehicle distance assistance portion 301 consisting of the preceding vehicle detection portion 310, the entering vehicle detection portion 320, and speed assistance portion 330 is used to perform a speed adjustment assistance. Furthermore, the target trajectory assistance portion 302 consisting of the preceding vehicle travel trajectory acquisition portion 340, the entering vehicle travel trajectory acquisition portion 350, the location determination portion 360, the target trajectory setting portion 370, and the steer assistance portion 380 is used to perform a travel trajectory assistance.

Figure 3:
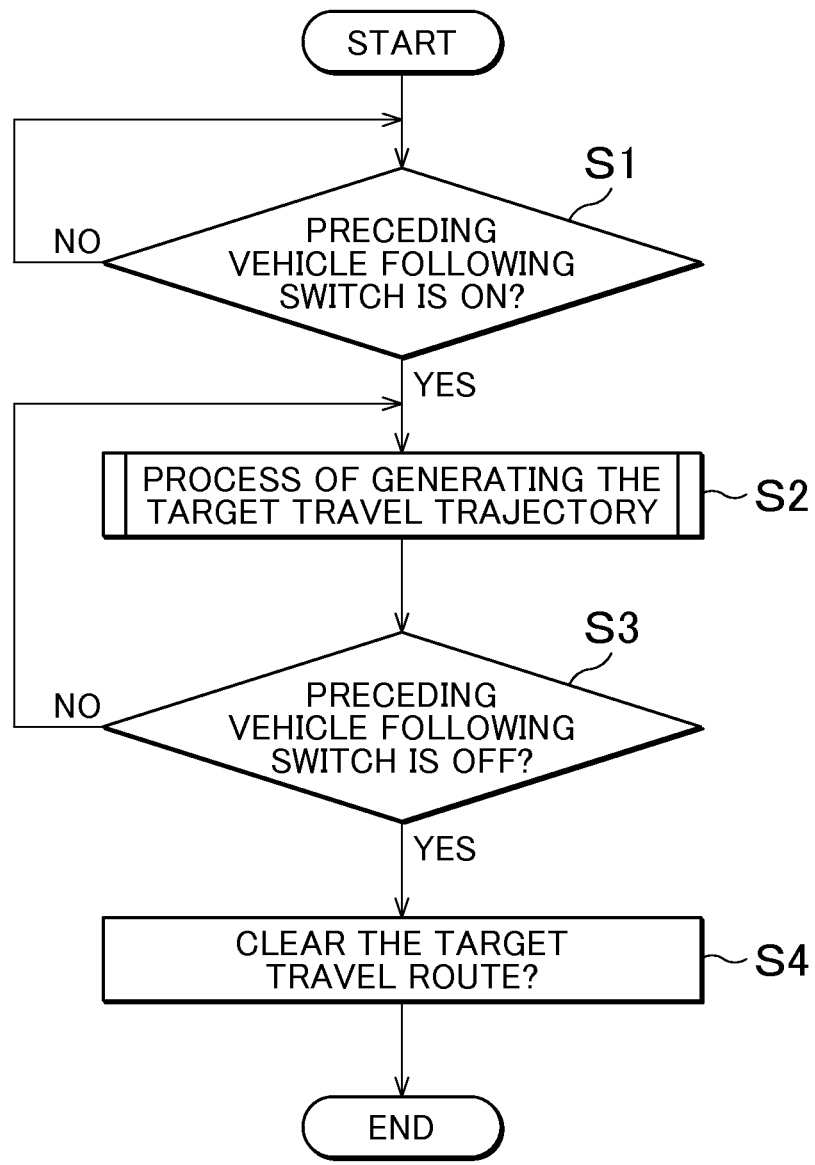
FIG. 3 is a flow chart illustrating the operation/ending steps of target travel trajectory generation process of the driving assistance device.

Next, the steps of the preceding vehicle following assistance are described in reference with FIGS. 3-4. Firstly, it is determined whether the preceding vehicle following assistance can be performed by taking the vehicle 10 is travelling etc. as conditions. As illustrated in FIG. 3, if the vehicle 10 starts to travel, the driving assistance device 300 determines whether the switch (not shown) indicating the performing of the preceding vehicle following assistance is turned on (Step S1). The state of the switch indicating the performing of the preceding vehicle following assistance is input from the vehicle-mounted control device 200 as the following assistance setting information. When it is determined that the switch indicating the performing of the preceding vehicle following assistance is turned off (NO in Step S1), the driving assistance device 300 returns the process to Step S1 at a predetermined time interval. That is, it is determined again whether the switch indicating the performing of the preceding vehicle following assistance is turned on (Step S1).

On the other hand, when it is determined that the switch indicating the performing of the preceding vehicle following assistance is turned on (YES in Step S1), the driving assistance device 300 performs the process of generating the target travel trajectory (Step S2). Then, if the process of generating the target travel trajectory ends, the driving assistance device 300 determines whether the switch indicating the performing of the preceding vehicle following assistance is turned off (Step S3).

Then, when it is determined that the switch indicating the performing of the preceding vehicle following assistance is not turned off (NO in Step S3), the driving assistance device 300 returns the process to Step S2 at a predetermined time interval. That is, the process of generating the target travel trajectory is repeated (Step S2). Furthermore, when it is determined that the switch indicating the performing of the preceding vehicle following assistance is turned off (YES in Step S3), the driving assistance device 300 clears the target travel trajectory (Step S4), and ends the preceding vehicle following assistance. Therefore, if the target travel trajectory is cleared, the fact of ending the preceding vehicle following assistance is notified to the user by the display of the display device 113, thus the user can acknowledge that it is not in the performing of the driving assistance. Moreover, whether the switch indicating the performing of the preceding vehicle following assistance is turned on or turned off, the preceding vehicle following assistance ends due to the situation that the vehicle 10 is not travelling.

Figure 4A:
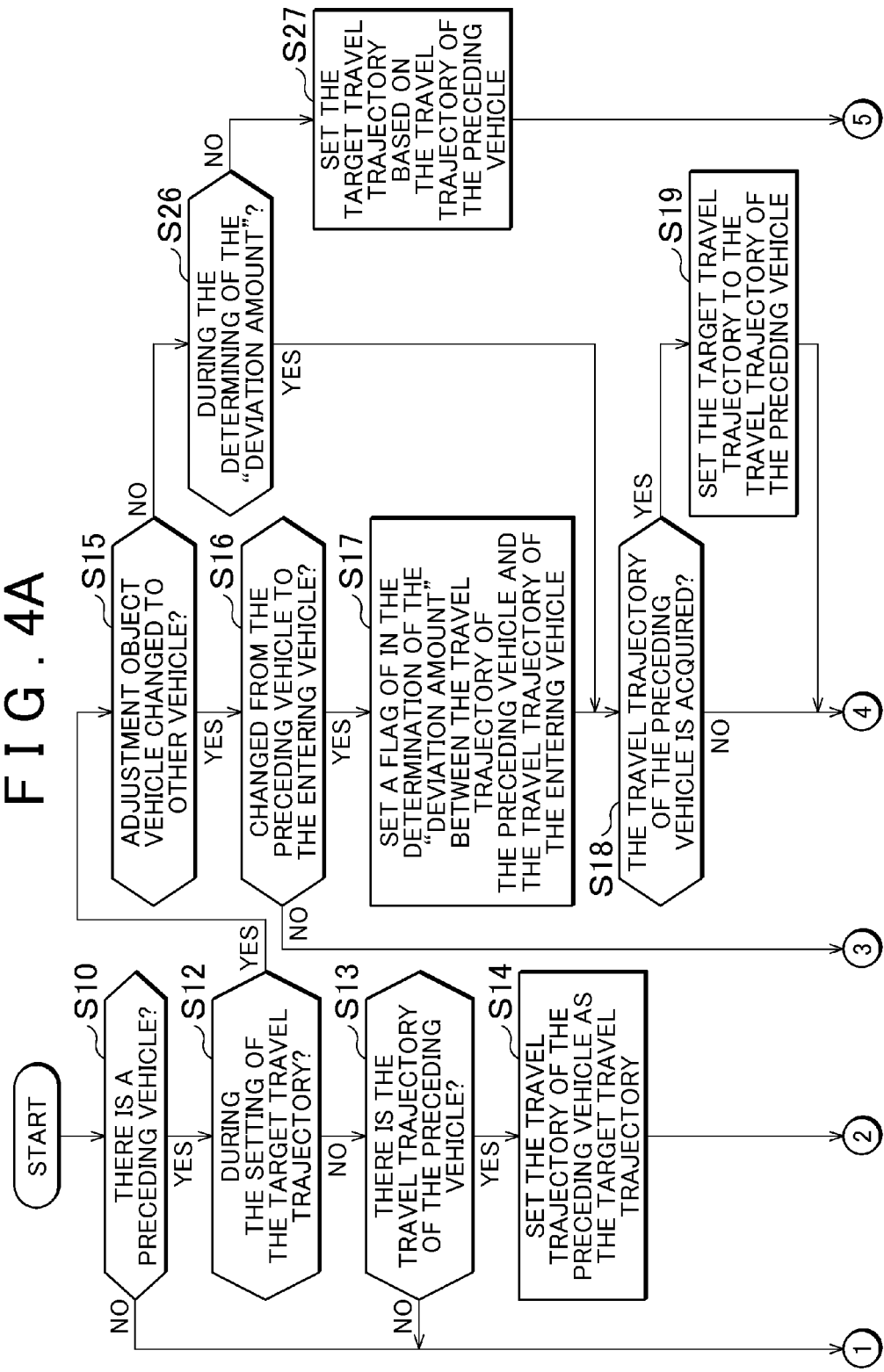

Next, the process of generating the target travel trajectory (Step S2) is described in details. As illustrated in FIGS. 4A and 4B, if the process of generating the target travel trajectory is started, then the driving assistance device 300 determines whether the preceding vehicle 20 is present (Step S10). When it is determined that the preceding vehicle 20 is absent (NO in Step S10), the driving assistance device 300 clears the target travel trajectory (Step S11), and ends the process of generating the target travel trajectory.

On the other hand, when it is determined that the preceding vehicle 20 is present (YES in Step S10), the driving assistance device 300 determines whether to perform setting the target travel trajectory (Step S12). Performing setting the target travel trajectory is determined by setting with (not cleared) the target travel trajectory. When it is determined that it is not setting the target travel trajectory (NO in Step S12), the driving assistance device 300 determines whether the travel trajectory 21 of the preceding vehicle 20 is present according to the travel position of the vehicle 10 (Step S13). When it is determined that the travel trajectory 21 of the preceding vehicle 20 is absent according to the travel position of the vehicle 10 (NO in Step S13), the driving assistance device 300 clears the target travel trajectory (Step S11), and ends the process of generating the target travel trajectory. On the other hand, when it is determined that the travel trajectory 21 of the preceding vehicle 20 is present according to the travel position of the vehicle 10 (YES in Step S13), the driving assistance device 300 sets the travel trajectory 21 of the preceding vehicle 20 as the target travel trajectory (Step S14), and ends the process of generating the target travel trajectory.

Furthermore, when it is determined that it is during the setting of the target travel trajectory (YES in Step S12), the driving assistance device 300 determines whether the adjustment object vehicle of the speed assistance portion 330 is switched to other vehicle (Step S15).

Then, when it is determined that the adjustment object vehicle of the speed assistance portion 330 is not switched to other vehicle (NO in Step S15), the driving assistance device 300 determines whether it is during the determining of the "deviation amount" (Step S26). Whether or not it is during the determining of the "deviation amount" is determined by setting a flag of determining the "deviation amount", such as setting the flag to "1". When it is determined that it is not during the determining of the "deviation amount" (NO in Step S26), the driving assistance device 300 sets the target travel trajectory based on the travel trajectory 21 of the preceding vehicle 20 (Step S27), and ends the process of generating the target travel trajectory. On the other hand, when it is determined that it is during the determining of the "deviation amount" (YES in Step S26), the driving assistance device 300 proceeds the process to Step S18 as described in the following.

Furthermore, when it is determined that the adjustment object vehicle of the speed assistance portion 330 is changed to other vehicle (YES in Step S15), the driving assistance device 300 determines whether the adjustment object vehicle of the speed assistance portion 330 is switched from the preceding vehicle 20 to the entering vehicle 30 (Step S16).

When it is determined that the adjustment object vehicle of the speed assistance portion 330 is changed from the preceding vehicle 20 to the entering vehicle 30 (NO in Step S16), the driving assistance device 300 clears the target travel trajectory (Step S25), and ends the process of generating the target travel trajectory. This is the following circumstance: the other vehicle other than the entering vehicle 30 becomes the preceding vehicle 20, because the vehicle 10 changes its lane, etc.

On the other hand, when it is determined that the adjustment object vehicle of the speed assistance portion 330 is changed from the preceding vehicle 20 to the entering vehicle 30 (YES in Step S16), the driving assistance device 300 sets a flag of determining the "deviation amount" (Step S17).

The driving assistance device 300 determines whether the travel trajectory 21 of the preceding vehicle 20 before the entering of the entering vehicle 30 is acquired (Step S18). When it is determined that the travel trajectory 21 of the preceding vehicle 20 before the entering of the entering vehicle 30 is acquired (YES in Step S18), the driving assistance device 300 sets the target travel trajectory based on the travel trajectory 21 of the preceding vehicle 20 (Step S19), and proceeds the process to Step S20 as described in the following. On the other hand, when it is determined that the travel trajectory 21 of the preceding vehicle 20 before the entering of the entering vehicle 30 is not acquired (NO in Step S18), the driving assistance device 300 proceeds the process to Step S20 as described in the following.

The driving assistance device 300 determines whether the "deviation amount H1" between the travel trajectory 21 of the preceding vehicle 20 and the travel trajectory 31 of the entering vehicle 30 can be calculated (Step S20). When it is determined that the "deviation amount H1" between the travel trajectory 21 of the preceding vehicle 20 and the travel trajectory 31 of the entering vehicle 30 cannot be calculated (NO in Step S20), the driving assistance device 300 sets the travel trajectory 31 of the entering vehicle 30 as the target travel trajectory (Step S21). Then, the flag of determining the "deviation amount" is unset (Step S24) and the process of generating the target travel trajectory ends.

On the other hand, when it is determined that the "deviation amount H1" between the travel trajectory 21 of the preceding vehicle 20 and the travel trajectory 31 of the entering vehicle 30 can be calculated (YES in Step S20), the driving assistance device 300 calculates the "deviation amount H1" between the travel trajectory 21 of the preceding vehicle 20 and the travel trajectory 31 of the entering vehicle 30 (Step S22). Then, the driving assistance device 300 determines whether the "deviation amount H1" is the "determination value $\Delta h$" or below (Step S23). When it is determined that the "deviation amount H1" is not the "determination value $\Delta h$" or below (NO in Step S23), the driving assistance device 300 ends the process of generating the target travel trajectory.

Furthermore, when it is determined that the "deviation amount H1" is the "determination value $\Delta h$" or below (YES in Step S23), the driving assistance device 300 unsets the flag of determining the "deviation amount" (Step S24), and ends the process of generating the target travel trajectory.

Furthermore, by repeating the above process of generating the target travel trajectory, based on the event of setting the travel trajectory 21 of the preceding vehicle 20 as the target travel trajectory, and the event that the "deviation amount H1" becomes the 'determination value $\Delta h$" or below, the travel trajectory 31 of the entering vehicle 30 is set as the target travel trajectory.

By reference to FIGS. 5-8, the effect of this embodiment is described. As illustrated in FIG. 5, the vehicle 10 travelling on the lane R1 sets the vehicle which travels in the front in the travel direction of the vehicle 10 and closest to the vehicle 10 as the preceding vehicle 20. Furthermore, in the vehicle 10, the preceding vehicle following assistance is performed with respect to the preceding vehicle 20. That is, in the vehicle 10, the inter-vehicle distance assistance is performed with respect to the preceding vehicle 20, and the travel-trajectory assistance is performed with respect to the travel trajectory 21 of the preceding vehicle 20. Furthermore, in the adjacent lane, the entering vehicle 30 is travelling in a same direction with the travel direction of the vehicle 10. The vehicle 10 acquires the travel trajectory 31 with respect to the entering vehicle 30, as the entering candidate vehicle.

As illustrated in FIG. 6, based on the event that the other vehicle (entering vehicle 30) enters the travelling lane R1, the vehicle 10 detects the other vehicle that enters between the vehicle 10 and the preceding vehicle 20 as the entering vehicle 30. At the time that the entering vehicle 30 is detected, in the inter-vehicle distance assistance, the adjustment object vehicle as the assistance object is changed from the preceding vehicle 20 to the entering vehicle 3G from the viewpoint of preventing rear-end collision.

On the other hand, at the time that the entering vehicle 30 is detected, in the travel trajectory assistance, the "deviation amount H1" between the travel trajectory 21 of the preceding vehicle 20 and the travel trajectory 31 of the entering vehicle 30 is calculated. The "deviation amount H1" is a distance from the predetermined position of the travel trajectory 31 of the entering vehicle 30 to the travel trajectory 21 of the preceding vehicle 20. For example, the "deviation amount H1" is the shortest distance from the predetermined position of the travel trajectory 31 of the entering vehicle 30 to the travel trajectory 21 of the preceding vehicle 20, it is obtained as a vertical line from the predetermined position of the travel trajectory 31 of the entering vehicle 30 to the travel trajectory 21 of the preceding vehicle 20, that is, the length of the vertical line. Furthermore, it is a defined line; the vertical line can also be replaced with a line which intersects with the predetermined position of the travel trajectory 31 of the entering vehicle 30 and the travel trajectory 21 of the preceding vehicle 20. Moreover, the vehicle 10 compares the obtained "deviation amount H1" with the "determination value $\Delta h$", and determines whether the "deviation amount H1" is within the "determination value $\Delta h$". Furthermore, in FIG. 6, it is determined that the "deviation amount H1" is not within the "determination value $\Delta h$", the target travel trajectory is continuously set based on the travel trajectory 21 of the preceding vehicle 20.

As illustrated in FIG. 7, when the entering of the entering vehicle 30 between the vehicle 10 and the preceding vehicle 20 proceeds, in the travel trajectory assistance, the "deviation amount H1" is re-calculated (updated), and whether the re-calculated "deviation amount H1" is within the "determination value Δh" is determined at any time. Furthermore, in the aspect illustrated in FIG. 7, it is determined that the "deviation amount H1" is not within the "determination value Δh", the target travel trajectory is continuously set based on the travel trajectory 21 of the preceding vehicle 20.

As illustrated in FIG. 8, when the entering of the entering vehicle 30 between the vehicle 10 and the preceding vehicle 20 further proceeds, in the travel trajectory assistance, it is determined whether the re-calculated "deviation amount H1" is within the "determination value Δh". Then, in the aspect illustrated by FIG. 8, it is determined that the "deviation amount H1" is within the "determination value Δh", and the setting of the target travel trajectory is changed from the travel trajectory 21 of the preceding vehicle 20 to the travel trajectory 31 of the entering vehicle 30, and is set based on the travel trajectory 31 of the entering vehicle 30. Therefore, before a position where the "deviation amount H1" is the "determination value Δh" or below in the travel direction of the vehicle 10, the target travel trajectory is set as the travel trajectory 21 of the preceding vehicle 20; and further from the position where the "deviation amount H1" becomes the "determination value Δh" or below in the travel direction of the vehicle 10, the target travel trajectory is set as the travel trajectory 31 of the entering vehicle 30. Therefore, the travel position of the vehicle 10 reaches the position where the "deviation amount H1" becomes the "determination value Δh" or below, thereby the setting of the target travel trajectory is switched from the travel trajectory 21 of the preceding vehicle 20 to the travel trajectory 31 of the entering vehicle 30. Moreover, since the entering vehicle 30 enters between the vehicle 10 and the preceding vehicle 20, the preceding vehicle 20 cannot be seen from the vehicle 10, thus, the travel trajectory 21 of the preceding vehicle 20 further from the location 22 cannot be acquired.

Herein, in this embodiment, since the travel trajectory set as the target travel trajectory changes from the travel trajectory of the preceding vehicle 20 to that of the entering vehicle 30 with a small deviation, thus, even if the set travel trajectory is changed, the control gain relating to the following the target travel trajectory may not be changed.

According to this embodiment, a driving assistance device is provided in which a movement (unsteadiness) in the vehicle width direction of the host vehicle can be restrained, even when the entering vehicle 30 enters between the vehicle 10 and the preceding vehicle 20.

As described above, according to the driving assistance device of this embodiment, the following effect can be achieved. (1) At the position where the deviation amount H1 between the travel trajectory 21 of the preceding vehicle 20 and the travel trajectory 31 of the entering vehicle 30 becomes the predetermined determination value Δh or below, the setting of the target travel trajectory 11 is changed from the travel trajectory 21 of the preceding vehicle 20 to the travel trajectory 31 of the entering vehicle 30; therefore, at such changed position, the deviation amount H1 generated on the target travel trajectory 11 becomes the predetermined determination value Δh or below. Thus, since the deviation amount H1 generated on the target travel trajectory 11 is restrained; therefore, the assistance that intends to move the vehicle 10 in the vehicle width direction, which is the so-called unsteadiness, is restrained by the steer assistance. That is, even if the entering vehicle 30 is set as the preceding vehicle 20 in the speed assistance, in the steer assistance, until the position where the deviation amount H1 between the travel trajectory 21 of the preceding vehicle 20 and the travel trajectory 31of the entering vehicle 30 becomes the predetermined determination value Δh or below, the travel trajectory 21 of the preceding vehicle 20 is set as the target travel trajectory 11, and after the position where the deviation amount H1 becomes the predetermined determination value Δh or below, the travel trajectory 31 of the entering vehicle 30 is set as the target travel trajectory 11. Thus, the switching time needed by the speed assistance (inter-vehicle distance assistance), and the switching time needed by steer assistance (travel trajectory assistance) can be properly set. That is, the switching time of the steer assistance is set when the travel position of the vehicle 10 reaches the position where the "deviation amount H1" becomes the "determination value Δh" or below. Furthermore, when switching between the travel trajectory 21 of the preceding vehicle 20 and the travel trajectory 31 of the entering vehicle 30, the control gain relating to the steer assistance may not be decreased, thus, the responsibility of the steer assistance will not be decreased temporarily.

(2) The speed adjustment adjusted based on the vehicle width and lane width, and the steer amount adjustment adjusted based on the target travel trajectory 11 which set one point in the vehicle width direction as a basis, are switched under a circumstance that suits the basis, respectively. Furthermore, the "determination value Δh" can be determined based on the width of the vehicle body of the host vehicle, and the lane width of the lane on which the host vehicle is travelling, etc.

(3) According to the straight line which intersects with the travel trajectory 21 of the preceding vehicle 20 and the travel trajectory 31 of the entering vehicle 30, the deviation amount H1 can be easily calculated. (4) According to the straight line perpendicular to the travel trajectory 21 of the preceding vehicle 20, the deviation amount can be calculated more easily.

The Second Embodiment

By reference to FIGS. 9-18, the second embodiment which embodies the driving assistance device is described.

In this embodiment, when it is determined that the travel trajectory 21 of the preceding vehicle 20 cannot be acquired further from the location where the "deviation amount H1" becomes within the "determination value Δh", a presuming travel trajectory 35 is used, this configuration is different from the configuration of determining the "deviation amount H1" in the first embodiment, but the other configurations are the same. Therefore, the configuration different from the first embodiment is mainly described in the following; and as for the same configuration with the first embodiment, same reference numerals are used; and in order to make it convenient to be described, the detailed descriptions are omitted. Moreover, the same processes in the flowcharts of FIGS. 10A, 10B and 11, and in the flowchart of FIGS. 4A and 4B of the first embodiment are marked with the same reference numerals.

Figure 9:
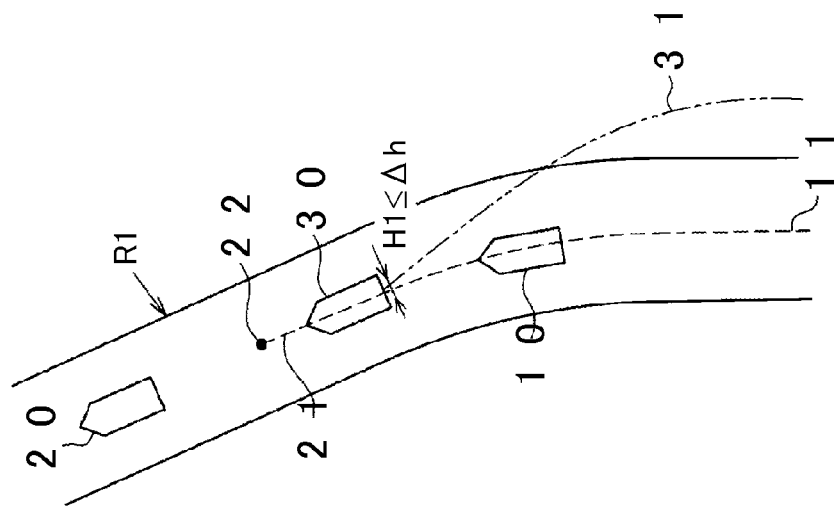
FIG. 9 is an illustration diagram illustrating the status when the target travel trajectory is generated of the second embodiment which embodies the driving assistance device.

As illustrated in FIG. 9, if the entering of the entering vehicle 30 enters between the vehicle 10 and the preceding vehicle 20 proceeds, in the travel trajectory assistance, it is determined whether the "deviation amount H1" calculated based on the travel trajectory 21 of the preceding vehicle 20 and the travel trajectory 31 of the entering vehicle 30 is within the "determination value Δh" at any time. However, although it is determined that the "deviation amount H1" is not within the "determination value Δh", sometimes the preceding vehicle 20 cannot be seen from the vehicle 10, thus, the travel trajectory 21 of the preceding vehicle 20 further from the location 22 cannot be acquired. Therefore, the "deviation amount H1" cannot be calculated, in the travel trajectory assistance, it is concerned that the switching from the travel trajectory 21of the preceding vehicle 20 to the travel trajectory 31 of the entering vehicle 30 is not performed properly.

Therefore, in this embodiment, in the travel trajectory assistance, when the travel trajectory 21 of the preceding vehicle 20 cannot be acquired, as the trajectory continued further at the travel trajectory 21 of the preceding vehicle 20, the presuming travel trajectory 35 is presumed. That is, a travel trajectory presuming portion 390 which obtains the presuming travel trajectory 35 presumed as the travel trajectory 21 of the preceding vehicle 20 is also included, further from the position where the travel trajectory 21 of the preceding vehicle 20 cannot be acquired, the location determination portion 360 uses presuming travel trajectory 35 of the preceding vehicle 20 as the travel trajectory 21 of the preceding vehicle 20. Moreover, in the travel trajectory assistance, a "presuming deviation amount H2" from the presumed presuming travel trajectory 35 and the travel trajectory 31 of the entering vehicle 30 for comparing with the "determination value Δh" is calculated.

Figure 13:
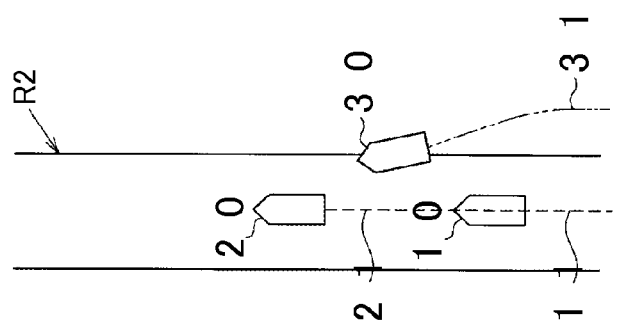
FIG. 13 is an illustration diagram illustrating the generation of the target travel trajectory of the driving assistance device.
Figure 12:
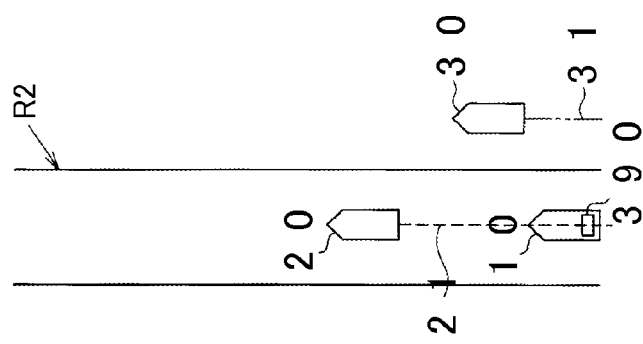
FIG. 12 is an illustration diagram illustrating the generation of the target travel trajectory of the driving assistance device.

Firstly, the general configuration of this embodiment is described by reference to FIGS. 12-15. As illustrated in FIG. 12, the vehicle 10 includes a travel trajectory presuming portion 390 in the driving assistance device 300. The vehicle 10 performs the inter-vehicle distance assistance and the travel trajectory assistance, thus, travels following the preceding vehicle 20. At this time, as illustrated in FIG. 13, according to the event that the entering vehicle 30 enters from the right front of the travel direction of the vehicle 10 between the vehicle 10 and the preceding vehicle 20 to a lane R2, the driving assistance device of the vehicle 10 switches the inter-vehicle distance assistance object vehicle from the preceding vehicle 20 to the entering vehicle 30. On the other hand, a distance between the travel trajectory 21 of the preceding vehicle 20 and the travel trajectory 31 of the entering vehicle 30, which is the deviation amount, is large; therefore, at this position, the target travel trajectory of the travel trajectory assistance does not switch from the travel trajectory 21 of the preceding vehicle 20 to the travel trajectory 31 of the entering vehicle 30.

Figure 14:
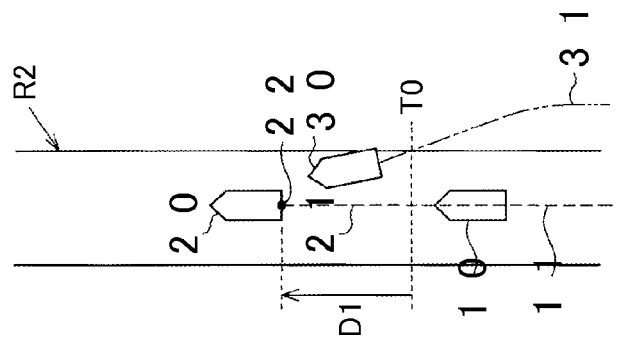
FIG. 14 is an illustration diagram illustrating the generation of the target travel trajectory of the driving assistance device.

Next, as illustrated in FIG. 14, the vehicle 10 determines the location T0 where the entering vehicle 30 enters the lane R2. Moreover, as illustrated in FIG. 15, the vehicle 10 determines the position corresponding to the location 22 where the travel trajectory 21 of the preceding vehicle 20 cannot be acquired, i.e. the location T1. Furthermore, the vehicle 10 presumes the presuming travel trajectory 35 for locations further from the location 22, based on the relationship between the travel trajectory 31 of the entering vehicle 30 from the location T0 to the location T1, and the travel trajectory 21 of the preceding vehicle 20. Furthermore, the vehicle 10 calculates the shortest distance between the presuming travel trajectory 35 and the travel trajectory 31 of the entering vehicle 30, which is the deviation, as the "presuming deviation amount H2" at any time, and detects the position where the "presuming deviation amount H2" becomes within the "determination value Δh". Furthermore, the vehicle 10 switches the target travel trajectory of the travel trajectory assistance from the travel trajectory 21 of the preceding vehicle 20 to the travel trajectory 31 of the entering vehicle 30 at the detected position.

Next, the configuration of this embodiment is described. Same with the first embodiment, it is determined whether the preceding vehicle following assistance can be performed by taking the vehicle 10 is travelling etc. as conditions. Therefore, the details of the process corresponding to the process of generating the target ravel trajectory in the first embodiment (Step S2) are described as follows.

Figure 10B:
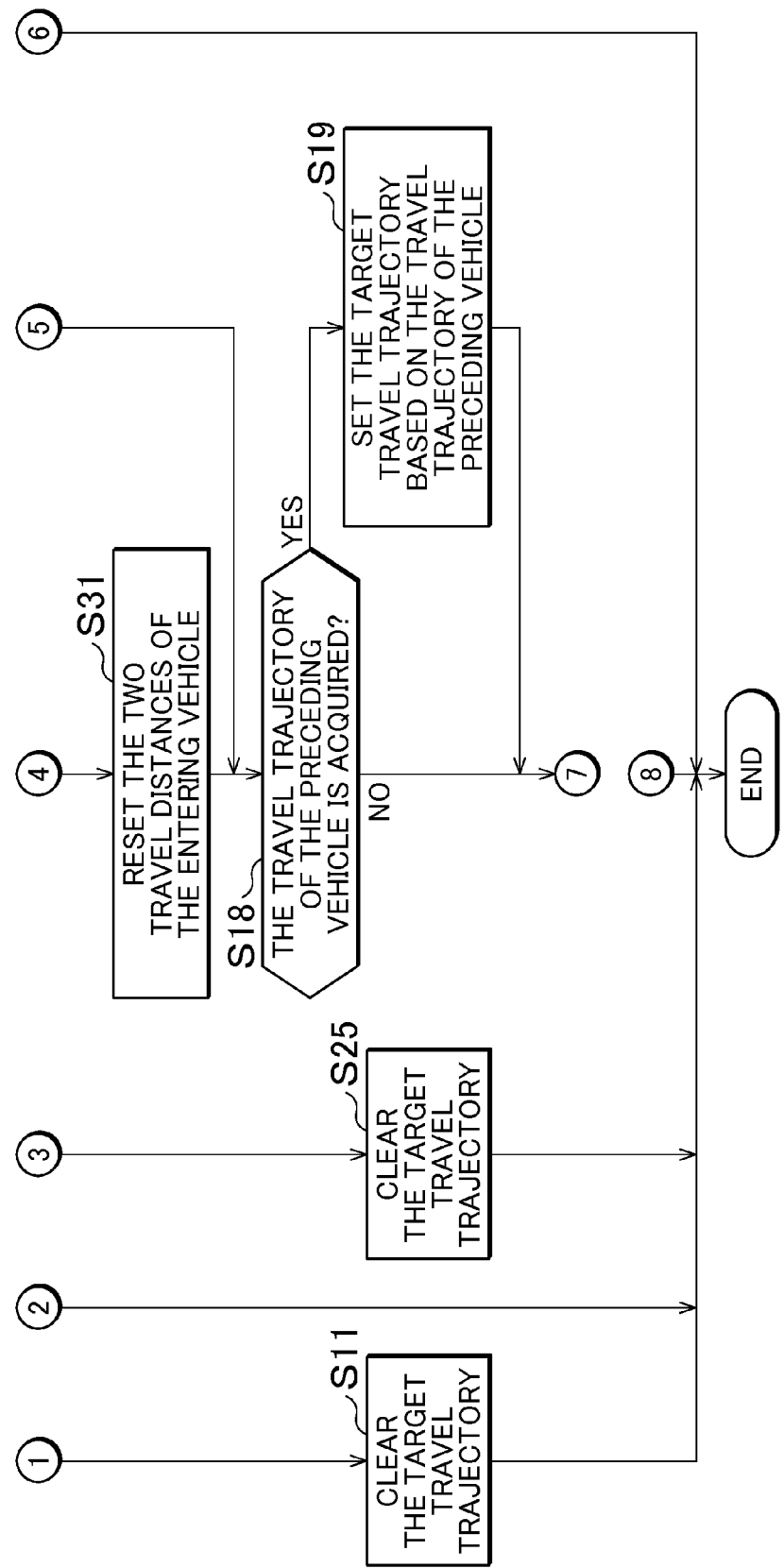
Figure 11:
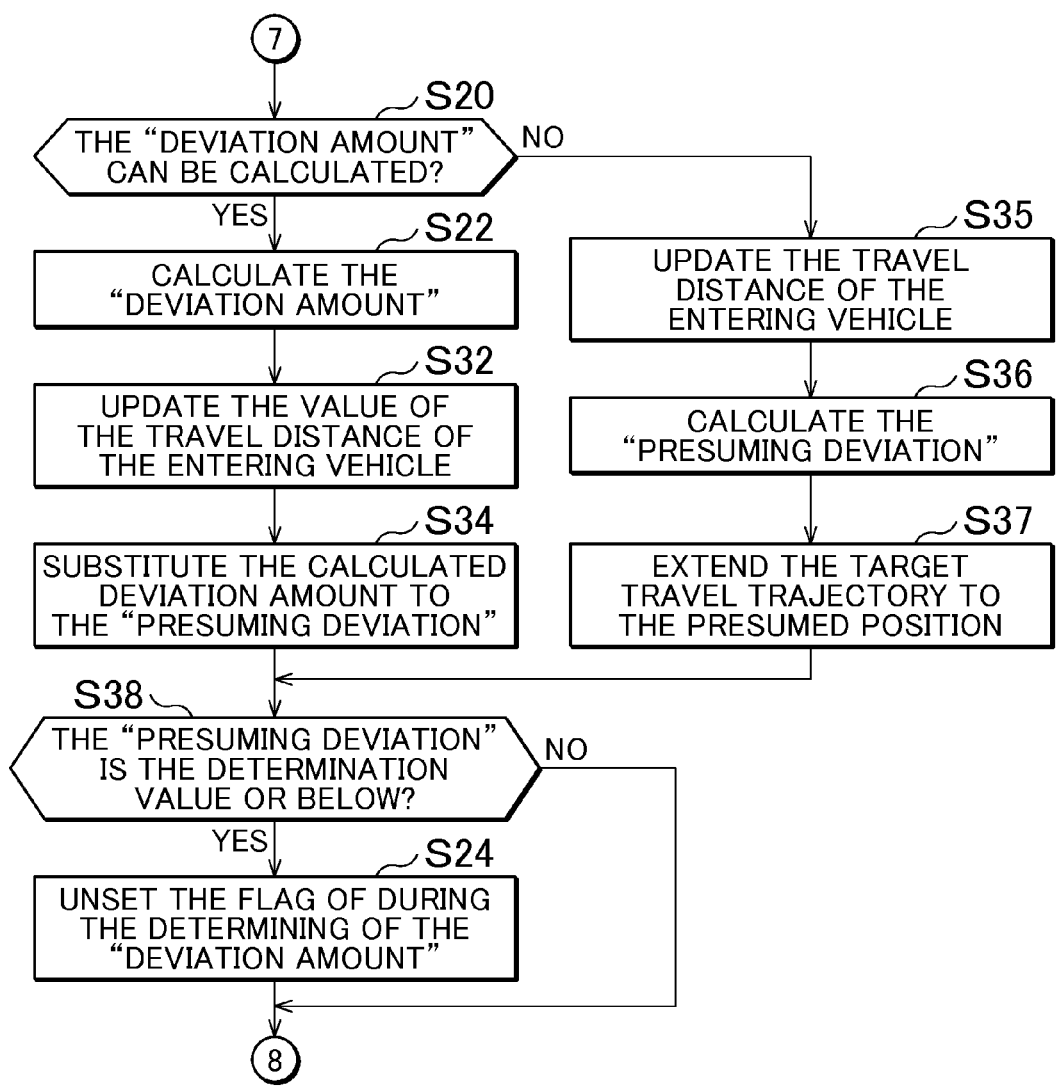
FIG. 11 is a flow chart illustrating the operation/ending steps of the target travel trajectory generation process of the driving assistance device.

As shown by FIGS. 10A, 10B and FIG. 11, if the process of generating the target travel trajectory is started, the driving assistance device 300 determines whether a preceding vehicle 20 is present (Step S10). When it is determined that the preceding vehicle 20 is absent (NO in Step S10), the driving assistance device 300 clears the target travel trajectory (Step S11), and ends the target process of generating the target travel trajectory.

On the other hand, when it is determined that the preceding vehicle 20 is present (YES in Step S10), the driving assistance device 300 determines whether it is during the setting of the target travel trajectory (Step S12). Whether or not it is during the setting of the target travel trajectory is determined by setting (not clearing) the target travel trajectory. When it is determined that it is not during the setting of the target travel trajectory (NO in Step S12), the driving assistance device 300 determines whether the travel trajectory 21 of the preceding vehicle 20 is present, according to the travel position of the vehicle 10 (Step S13). When it is determined that the travel trajectory 21 of the preceding vehicle 20 is absent according to the travel position of the vehicle 10 (NO in Step S10), the driving assistance device 300 clears the travel trajectory (Step S11), and ends the process of generating the target travel trajectory. On the other hand, when it is determined that the travel trajectory 21 of the preceding vehicle 20 is present according to the travel position of the vehicle 10 (YES in Step S13), the driving assistance device 300 sets the travel trajectory 21 of the preceding vehicle 20 as the target travel trajectory (Step S14) and ends the process of generating the target travel trajectory.

Moreover, when it is determined as during the setting of the target travel trajectory (YES in Step S12), the driving assistance device 300 determines whether or not the adjustment object vehicle of the speed assistance portion 330 has been switched to the other vehicle (Step S15).

Then, when it is determined that the adjustment object vehicle of the speed assistance portion 330 is not changed to the other vehicle (NO in Step S15), the driving assistance device 300 determines whether it is during the determining of the "deviation" (Step S26). The determining of the "deviation amount" is determined by setting a flag of during the determining of the "deviation amount", such as setting the flag to "1". When it is determined that it is not during the determining of the "deviation amount" (NO in Step S26), the driving assistance device 300 sets the target travel trajectory based on the travel trajectory 21 of the preceding vehicle 20 (Step S27), and ends the process of generating the target travel trajectory. On the other hand, when it is determined that it is during the determining of the "deviation amount" (YES in Step S26), the driving assistance device 300 proceeds the process to Step S18 as described in the following.

Furthermore, when it is determined that the adjustment object vehicle of the speed assistance portion 330 is changed to other vehicle (YES in Step S15), the driving assistance device 300 determines whether the adjustment object vehicle of the speed assistance portion 330 is switched from the preceding vehicle 20 to the entering vehicle 30 (Step S16).

When it is determined that the adjustment object vehicle of the speed assistance portion 330 is not changed from the preceding vehicle 20 to the entering vehicle 30 (NO in Step S16); the driving assistance device 300 clears the target travel trajectory (Step S25), and ends the process of generating the target travel trajectory. Such a circumstance is that the other vehicle other than the entering vehicle 30 becomes the preceding vehicle 20, because the vehicle 10 changes its lane, etc.

On the other end, when it is determined that the adjustment object vehicle of the speed assistance portion 330 is changed from the preceding vehicle 20 to the entering vehicle 30 (YES in Step S16), the driving assistance device 300 sets a flag of during the determining of the "deviation amount" (Step S17). Then, the driving assistance device 300 calculates the "initial deviation amount H0" of the target travel trajectory 11 and the travel trajectory 31 of the entering vehicle 30 (Step S30), and resets the values of the two kept travel distances (Step S31). For example, the values of the two travel distances D1d and D2d relating to the entering vehicle 30 used when calculating the presuming travel trajectory 35 (by reference to FIGS. 16 and 17) are set to "0".

Then, when it is determined that the travel trajectory 21 of the preceding vehicle 20 is acquired (YES in Step S18), the driving assistance device 300 sets the target travel trajectory based on the travel trajectory 21 of the preceding vehicle 20 (Step S19), and proceeds the process to Step S20, as described in the following. On the other hand, when it is determined that the travel trajectory 21 of the preceding vehicle 20 before the entering of the entering vehicle 30 is not acquired (YES in Step S18), the driving assistance device 300 proceeds the process to Step S20, as described in the following.

Then, when it is determined that the "deviation amount" between the travel trajectory 21 of the preceding vehicle 20 and the travel trajectory 31 of the entering vehicle 30 can be calculated (YES in Step S20), the driving assistance device 300 calculates the "deviation amount" between the travel trajectory 21 of the preceding vehicle 20 and the travel trajectory 31 of the entering vehicle 30 (Step S22). Moreover, the driving assistance device 300 updates the value of the travel distance D1d of the entering vehicle 30 (Step S32), and substitutes the calculated "deviation amount" to the presumed "presuming deviation amount H2" (Step S34). Then, the process proceeds to the Step S38 described as follows.

Figure 19:
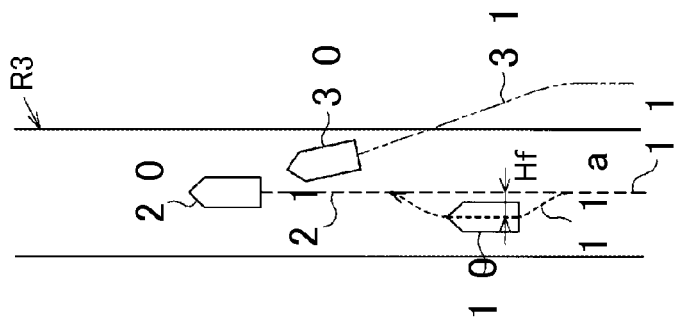
FIG. 19 is an illustration diagram illustrating the embodiment for generating the target travel trajectory of the third embodiment which embodies the driving assistance device.

Moreover, description is made with reference to FIG. 19, when it is determined that the "deviation amount" between the travel trajectory 21 of the preceding vehicle 20 and the travel trajectory 31 of the entering vehicle 30 cannot be calculated (NO in Step S20), the driving assistance device 300 updates the value of the travel distance D2d of the entering vehicle 30 (Step S35). As described in the following, using the updates, the position 34 of the presuming travel trajectory 35 corresponding to the position of the travel distance D2d of the entering vehicle 30 is determined.

Furthermore, the driving assistance device 300 calculates the "presuming deviation amount H2" between the position 34 on the travel trajectory 31 of the entering vehicle 30 corresponding to the travel distance D2d of the entering vehicle 30, and a position on the presuming travel trajectory 35 corresponding to that position (Step S36). Moreover, the driving assistance device 300 sets the trajectory from the location 22 of the travel trajectory 21 of the preceding vehicle 20 to the position 24 of the presuming travel trajectory 35, as the target travel trajectory 11 (Step S37). Then, the process proceeds to the Step S38 described as follows.

The driving assistance device 300 determines whether the "presuming deviation amount H2" is the "determination value Δh" or below (Step S38). When it is determined that the "presuming deviation amount H2" is not the "determination value Δh" or below (NO in Step S38), the driving assistance device 300 ends the process of generating the target travel trajectory. On the other hand, when it is determined that the "presuming deviation amount H2" is the "determination value Δh" or below (YES in Step S38), the driving assistance device 300 unsets the flag of determining the "deviation amount", and ends the process of generating the target travel trajectory.

Furthermore, by repeatedly performing the process of generating the target travel trajectory, the travel trajectory 21 of the preceding vehicle 20 is set as the target travel trajectory, or the presuming travel trajectory 35 is set, or the travel trajectory 31 of the entering vehicle 30 is set as the target travel trajectory based on the event that the "presuming deviation amount H2" becomes the "determination value Δh" or below.

Next, by reference to FIGS. 12-18, the calculation of the presuming travel trajectory is described. Firstly, by reference to FIGS. 12-15, the state change of the travel trajectory assistance of the vehicle 10 is described.

As illustrated in FIG. 12, the vehicle 10 travelling on the lane R2 performs preceding vehicle following assistance with respect to the preceding vehicle 20 travels in the front in the travel direction of the vehicle 10. In addition, in the adjacent lane, the entering vehicle 30 is travelling in the same direction with the travel direction of the vehicle 10. The vehicle 10 acquires the travel trajectory 31 of the entering vehicle 30, as the entering candidate vehicles.

As illustrated in FIG. 13, based on the event that the other vehicle (entering vehicle 30) enters the travelling lane R2, the vehicle 10 detects the other vehicle as the entering vehicle 30 that enters between the vehicle 10 and the preceding vehicle 20; and, in the inter-vehicle distance assistance, the adjustment object vehicle is changed from the preceding vehicle 20 to the entering vehicle 30.

On the other hand, as illustrated in FIG. 14, when detecting the entering vehicle 30, the vehicle 10 determines the location T0 where the entering vehicle 30 enters the lane R2, and determines the position in the target travel trajectory 11 that corresponds to the location T0. Herein, the position that corresponds to the location T0 can be set as the shortest distance to the target travel trajectory 11, which is length of a vertical line from the location T0 to the target travel trajectory, i.e., the line vertical to the target travel trajectory 11. In addition, the position of the preceding vehicle 20 is the location 22 where the travel trajectory 21 of the preceding vehicle 20 cannot be acquired, and a distance D1 from the position that corresponds to the location T0 to the location 22 in the target travel trajectory 11 can be calculated.

That is, as illustrated in FIG. 15, in the vehicle 10, the travel trajectory assistance is performed for each of the following areas: a first area Z1 where the target travel trajectory 11 sets the ravel trajectory 21 of the preceding vehicle 20; a third area Z3 where the target travel trajectory 11 sets the travel trajectory 31 of the entering vehicle 30; and a second area Z2 where the target ravel trajectory sets the presuming travel trajectory 35.

Firstly, in the first area Z1, the "initial deviation amount H0" at the location T0, the "deviation amount H1" at the location T1, a length "D1" of the target travel trajectory 11 from the location T0 to the location T1, and a length D1d of the travel trajectory 31 of the entering vehicle 30 are obtained (by reference to FIG. 16). The "initial deviation H0" at the location T0 and the "deviation amount H1" at the location T1 are, at each of the locations T0 and T1, the lengths in the vertical line vertical to the target travel trajectory 11 from the target travel trajectory 11 to the travel trajectory 31 of the entering vehicle 30.

Next, in the second area Z2, the location T3 (positions 23, 33) where the presuming travel trajectory 35 intersects with the travel trajectory 31, of the entering vehicle 30, and a length "D3" of the presuming travel trajectory 35 from the location T0 to the location T3, and a length "D3d" of the travel trajectory 31 of the entering vehicle 30 are obtained (by reference to FIG. 16). In addition, the length from the travel trajectory 35 to the travel trajectory 31 of the entering vehicle 30 at the points between the location T1 and the location T3, in the perpendicular line perpendicular to the presuming travel trajectory 35, i.e., the "presuming deviation amount H2", and a length "D2" of the presuming travel trajectory 35 from the location T0 at this time are obtained.

Furthermore, in the third area Z3, the travel trajectory 31 of the entering vehicle 30 is set as the target travel trajectory. Next, the calculation of the presuming travel trajectory is described in details by reference to FIGS. 16-18.

Firstly, as illustrated in FIG. 16, the "initial deviation amount H0" at the location T0, the "deviation amount H1" at the location T1, the length "D1d" of travel trajectory 31 of the entering vehicle 30 from the location T0 to location T1, and the length "D3d" of the travel trajectory 31 of the entering vehicle 30 from the location T0 to the location T3 are obtained from the states of the vehicle 10 and the entering vehicle 30 of the FIG. 16. At this time, as a first relational expression containing gradual change ratio, can use the expression (1) described below, and the gradual change ratio is the ratio of the travel trajectory 31 of the entering vehicle 30 approaching the travel trajectory 21 of the preceding vehicle 20.

$$D3d:(D3d-D1d)=H0:H1 \quad (1)$$

Figure 17:
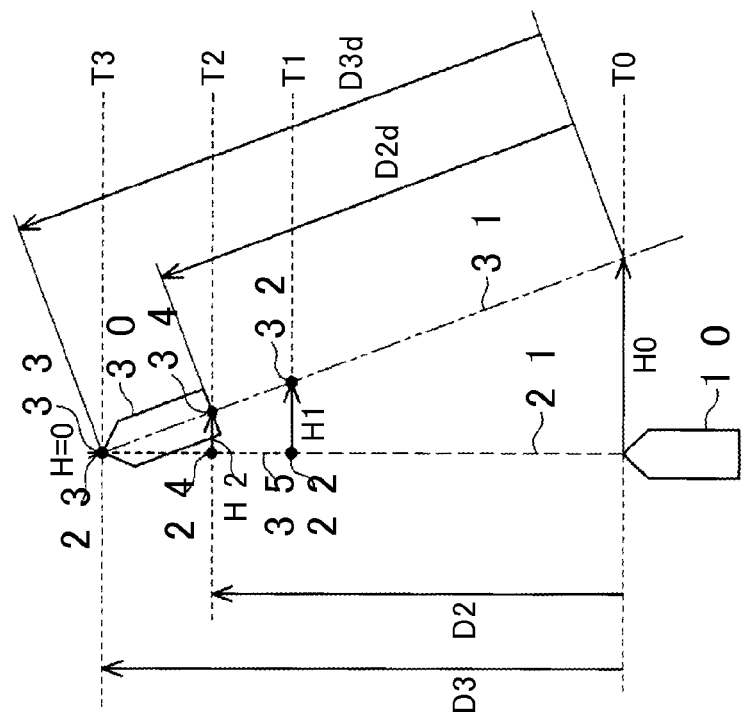
FIG. 17 is an illustration diagram illustrating the generation of the target travel trajectory of the driving assistance device.

In addition, as illustrated in FIG. 17, the "initial deviation amount H0" at the location T0, the "deviation amount H2" at the location T2, the length "D2d" of travel trajectory 31 from the location T0 to the location T1, and the length "D3d" of the travel trajectory 31 of the entering vehicle 30 from the location T0 to the location T3 are obtained from the states of the vehicle 10 and the entering vehicle 30 of the FIG. 17. At this time, as a second relational expression containing the same gradual change ratio, the expression (2) described below can be used.

$$D3d:(D3d-D2d)=H0:H2 \quad (2)$$

Incidentally, since if the presuming travel trajectory 35 is not calculated to the location T3, the D3d cannot be used; therefore, as an expression eliminated with the D3d which cannot be calculated at the location T2, the following expression (3) can be obtained from the above expression (1) and (2).

$$H2=H0-D2d \cdot (H0-H1)/D1d \quad (3)$$

That is, based on the expression (3), the vehicle 10 can presume the position where it is away from the travelling position of the entering vehicle 30 by the "presuming deviation amount H2", as a position on the presuming travel trajectory 35.

Since the "presuming deviation amount H2" contains a travel trajectory similar ratio acquired as the ratio that the travel trajectory 31 of the entering vehicle 30 approaches the travel trajectory acquired as the travel trajectory 21 of the preceding vehicle 20, thus, the presuming travel trajectory can be obtained based on the obtained similar ratio and the travel trajectory 31 of the entering vehicle 30.

In addition, according to the "presuming deviation amount H2", the distance between the location T0 of the travel trajectory 21 of the preceding vehicle 20 and the travel trajectory 31 of the entering vehicle 30 is obtained as the inter-trajectory distance (initial deviation amount H0), and the calculated inter-trajectory distance (initial deviation amount H0) is decreased based on the similar ratio of the travel trajectory 31 of the entering vehicle 30 (calculates H2), thus, the presuming travel trajectory can be calculated.

Figure 18:
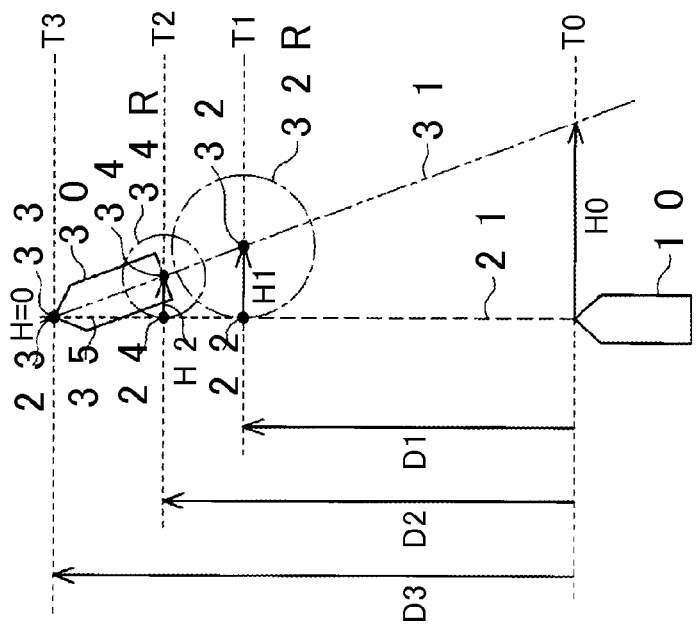
FIG. 18 is an illustration diagram illustrating the generation of the target travel trajectory of the driving assistance device.

As illustrated in FIG. 18, in the creating process of the target travel trajectory, in the second area Z2, a process of creating the presuming travel trajectory 35 is performed. In the process of creating the presuming travel trajectory 35, firstly, after setting the target travel trajectory 11 to the location 22, at the position 32 of the travel trajectory 31 of the entering vehicle 30 corresponding to the location 22 (location T1), the "presuming deviation amount H2" is calculated based on expression (3). Furthermore, a circle 32R with a radius of the "presuming deviation amount H2" with a center on the position 32 is presumed, and the trajectory extends from the location 22 of the target travel trajectory 11 in a manner of closing to a straight line as much as possible and tangent to the periphery of the circle 32R is presumed. In addition, at the location T1, the "presuming deviation amount H2" is the same value with the "deviation amount H1".

Then, such a creating process of the target travel trajectory is periodically repeated based on the travel trajectory 31 of the entering vehicle 30 moves forward. That is, in the creating process of the target travel trajectory, the position 34 of the travel trajectory 31 of the entering vehicle 30 is set as the location T2, and the "presuming deviation amount H2" is calculated based on expression (3). Furthermore, the circle 34R with a radius of the "presuming deviation amount H2" with a center on the position 34 is presumed, and the trajectory that extends from the location 22 of the target travel trajectory 11 in a manner of closing to a straight line and tangent to the periphery of the circle 34R is presumed. Therefore, the presuming travel trajectory 35 is set to the position 24 corresponding to the location T2.

Therefore, the presuming travel trajectory 35 is set as passing the end position (location 22) of the target travel trajectory 11, and tangent to the circle that has a radius of "presuming deviation amount H2" from the point of the travel trajectory 31 of the entering vehicle 30.

In addition, in the process of creating the target travel trajectory, it is also determined whether the calculated "presuming deviation amount H2" is within the "determination value Δh". Furthermore, when it is determined that the "presuming deviation amount H2" is within the "determination value Δh", since the travel trajectory 31 of the entering vehicle 30 is set as the target travel trajectory, thus the process of creating the presuming travel trajectory 35 is ended.

Therefore, a driving assistance device can be provided in which the restraining of the uncomfortable feeling of the user can be suitably achieved even if the entering vehicle 30 enters between the vehicle 10 and the preceding vehicle 20.

As described above, according to the driving assistance device of this embodiment, other than the effects (1)-(4) described in the first embodiment, the following effect can also be obtained.

(5) Even when the travel trajectory 21 of the preceding vehicle 20 cannot be acquired, the steering control is performed to follow the presuming travel trajectory 35 of the preceding vehicle 20, until the location; where the deviation amount (presuming deviation amount H2) between the presuming travel trajectory 35 of the preceding vehicle 20 and the travel trajectory 31 of the entering vehicle 30 becomes the predetermined determination value Δh or below, thus, the movement of the host vehicle with respect to the deviation amount between the presuming travel trajectory 35 of the preceding vehicle 20 and the travel trajectory 31 of the entering vehicle 30 can be restrained (the unsteadiness is reduced).

(6) Even when the travel trajectory 21of the receding vehicle 20 cannot be acquired, the presuming travel trajectory 35 presumed as the travel trajectory 21 of the preceding vehicle 20 from the travel trajectory 31 of the entering vehicle 30 is used, thus, the presuming deviation amount H2 with respect to the travel trajectory 31 of the entering vehicle 30 is calculated, the location where the deviation amount becomes with the predetermined determination value Δh or below can be determined.

(7) Since the presuming travel trajectory of the preceding vehicle 20 is presumed based on the similar ratio of the entering vehicle 30; therefore, the presumed presuming travel trajectory 35 has high continuity with respect to the travel trajectory 31 of the entering vehicle 30.

The Third Embodiment

By reference to FIG. 19, the third embodiment which embodies the driving assistance device is described. In this embodiment, the configuration of changing the travel position of the vehicle 10 and acquire the travel trajectory 21 of the preceding vehicle 20 for a long-term, this is different from the configuration of acquiring the travel trajectory 21 of the preceding vehicle 20 in the first embodiment, but the other configurations are the same. Therefore, the different configuration from the first embodiment is described as follows; and as for the same configuration with the first embodiment, same reference numerals are used; and in order to make it convenient for describing, the detailed descriptions are omitted.

Incidentally, in order to calculate the "deviation amount H1", the travel trajectory 21 of the preceding vehicle 20 and the travel trajectory 31 of the entering vehicle 30 are necessary. However, if the entering vehicle 30 enters between the vehicle 10 and preceding vehicle 20, the preceding vehicle 20 cannot be shot from the vehicle 10, or cannot be measured by the radar; thus, the travel trajectory 21 of the preceding vehicle 20 cannot be acquired.

Therefore, in this embodiment, even if the entering vehicle 30 enters between the vehicle 10 and the preceding vehicle 20, the time period that is capable of acquiring the travel trajectory 21 of the preceding vehicle 20 can be guaranteed as long as possible. That is, the steer assistance portion 380 of the vehicle 10 performs an assistance to assist the vehicle 10 to move towards a width direction of the lane R3 that is opposite to the entering direction of the entering vehicle 30, when it is determined that it is difficult to acquire the travel trajectory of the preceding vehicle 20 due to the effect of the entering vehicle 30. The steer assistance portion 380 performs the determination that it is difficult to acquire the travel trajectory 21 of the preceding vehicle 20 due to the effect of the entering vehicle 30, based on the event that the entering vehicle 30 enters the width occupied by the travelling vehicle 10 in a direction perpendicular to the travel direction of the vehicle 10. For example, as the event that the entering vehicle 30 enters the width occupied by the travelling vehicle 10, the entering vehicle detection portion 320 detecting the entering vehicle 30; the interval between the width occupied by the vehicle body width of the vehicle 10 when travelling and the entering vehicle 30; and in the image data, the vehicle body of the entering vehicle 30 overlapping with a part of the vehicle body of the preceding vehicle 20 etc. may be used.

As illustrated in FIG. 19, in the lane R3, the vehicle 10 performs travel trajectory assistance to the target travel trajectory 11 which is set based on the travel trajectory 21 of the preceding vehicle 20. If the vehicle 10 detects the entering vehicle 30, the position where the target travel trajectory 11 moves in the direction opposite to the entering direction of the entering vehicle 30 by an offset value Hf is used as the presuming travel trajectory 11a to set the target travel trajectory. Therefore, the vehicle 10 performs travel trajectory assistance to the presuming travel trajectory 11a. In addition, the target travel trajectory 11 is set as moving slowly from the travel trajectory 21 of the preceding vehicle 20 to the presuming travel trajectory 11a. In addition, the offset value Hf is a preset value, which keeps the vehicle 10 within the travelling lane R3. In addition, the offset value Hf is set as a distance of the perpendicular direction to the target travel trajectory 11.

Furthermore, the vehicle 10 changes the setting of the target travel trajectory 11 from the presuming travel trajectory 11a to the acquired travel trajectory 21 of the preceding vehicle 20, based on the event that the travel trajectory 21 of the preceding vehicle 20 cannot be acquired. The target travel trajectory 11 is set as moving slowly from the presuming travel trajectory 11a to the travel trajectory 21 of the preceding vehicle 20. That is, the target travel trajectory 11 returns to the target travel trajectory 11 before changing to the presuming travel trajectory 11a. Therefore, the assistance that assists the vehicle 10 to move to a lane width direction opposite to the entering direction of the entering vehicle 30 is ended.

Therefore, after the position where the travel trajectory 21 of the preceding vehicle 20 cannot be acquired, the area that has to be travelled on based on the presuming travel trajectory can be eliminated or shortened. In addition, since the vehicle 10 travels by avoiding the entering vehicle 30, thus, the travel satisfies the feeling of the users and brings peace to the user. Moreover, the user can acknowledge that the following travelling assistance is performing.

As described above, according to the driving assistance device of this embodiment, other than the effects (1)-(4) described in the first embodiment, the following effect can also be obtained.

(8) Since it is capable of delaying the timing when the vehicle 10 overlaps with the entering vehicle 30 in a range necessary for detecting the preceding vehicle 20, or reducing the overlapping; therefore, even with the entering of the entering vehicle 30, the travel trajectory 21 of the preceding vehicle 20 can be acquired as long as possible. Specifically, when the entering vehicle 30 is a large vehicle, there is a high possibility that the vehicle 10 cannot acquire the travel trajectory of the preceding vehicle 20; however, the vehicle 10 can acquire the travel trajectory 21 of the preceding vehicle longer than usual.

(9) By presuming the presuming travel trajectory 11a when the entering vehicle 30 enters the width occupied by the vehicle 10, the vehicle 10 can be moved with allowance;

therefore, the unconformable feeling of the user brought by the assistance of acquiring the trajectory of the preceding vehicle 20 is small.

(10) A driving assistance is provided in which when it is not necessary to use the travel trajectory 21 of the preceding vehicle 20 for the target travel trajectory 11 of the vehicle 10, the travel route of the vehicle 10 returns to the target travel trajectory 11, and the uncomfortable feeling of the user is small.

The Fourth Embodiment

Figure 21:
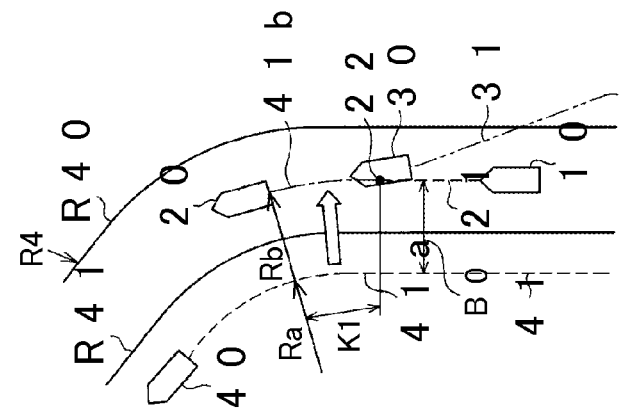
FIG. 21 is an illustration diagram illustrating the generation of the target travel trajectory of the driving assistance device.
Figure 20:
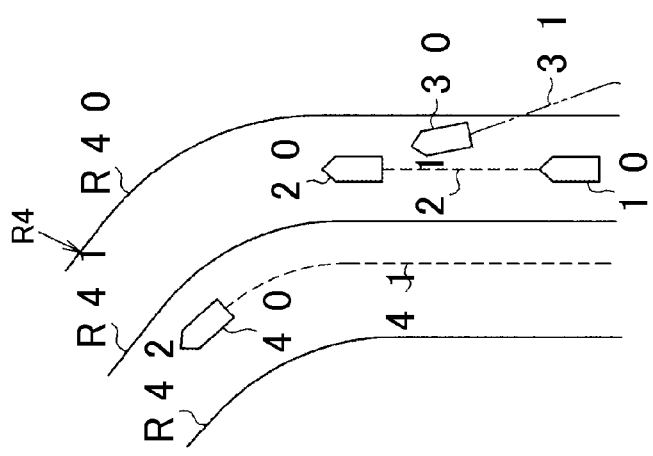
FIG. 20 is an illustration diagram illustrating the generation of the target travel trajectory of the fourth embodiment which embodies the driving assistance device.

By reference to FIGS. 20 and 21, the fourth embodiment which embodies the driving assistance device is described.

In this embodiment, the configuration is that the presuming travel trajectory is calculated based on the information of the adjacent vehicle 40 etc., this is different from the configuration in the second embodiment, but the other configurations are the same. Therefore, the different configuration from the second embodiment is described as follows; and as for the same configuration with the first embodiment, same reference numerals are used; and in order to make it convenient for describing, the detailed descriptions are omitted.

In this embodiment, when the travel trajectory 21 of the preceding vehicle 20 cannot be acquired due to the entering of the entering vehicle 30, the presuming travel trajectory is created based on the travel trajectory 41 of the adjacent vehicle 40. Therefore, based on the travel trajectory 41 of the adjacent vehicle 40 which travels in the lane R41 adjacent to the lane R40 on which the vehicle 10 travels, the presuming travel trajectory is obtained.

As illustrated in FIG. 20, in the lane R4, the vehicle 10 performs travel trajectory assistance to the target travel trajectory 11 set based on the travel trajectory 21 of the preceding vehicle 20. However, as illustrated in FIG. 21, if the entering vehicle 30 enters between the vehicle 10 and the preceding vehicle 20, the preceding vehicle 20 cannot be shot from the vehicle 10, or cannot be measured by the radar; thus, the travel trajectory 21 of the preceding vehicle 20 further from location 22 cannot be acquired.

Therefore, the presuming travel trajectory is calculated based on the travel trajectory 41 of the adjacent vehicle 40, and the calculated presuming travel trajectory is set as the target travel trajectory. Firstly, the area K1 in the acquired travel trajectory 41 of the adjacent vehicle 40 and further from the location 22 in the travel trajectory 21 of the preceding vehicle 20 is determined.

Furthermore, when it is determined that the area K1 is a straight line area, the travel trajectory 41 of the adjacent vehicle 40 is moved in parallel, thus, it is set as the presuming travel trajectory. Therefore, further from the location 22 in the travel trajectory 21 of the preceding vehicle 20, the target travel trajectory is also set based on the presuming travel trajectory.

In addition, when it is determined that the area K1 is a curve area, based on the difference between the radius of the travel trajectory 41 of the adjacent vehicle 40 corresponding to area K1, and the radius of the lane R40 on which the vehicle 10 travels, the travel trajectory 41 of the adjacent vehicle 40 that travels on the lane R41 is corrected to become the travel trajectory of the lane R40. For example, when the radius of the lane R41 corresponding to area K1 is measured as Ra, and the lane interval between the lane R41 and the lane R40 is B0, the radius Rb of the lane R40 on which the vehicle 10 travels is obtained based on Ra+B0. Furthermore, based on the radius Ra of the lane R41 and the radius Rb of the lane R40, the travel trajectory 41 (trajectory 41*a*) of the adjacent vehicle 40 corresponding to area K1 is corrected, thus, the corrected travel trajectory becomes the presuming travel trajectory (presuming trajectory 41*b*) and is set as the target travel trajectory further from the location 22 of the ravel trajectory 21 of the preceding vehicle 20.

As described above, according to the driving assistance device of this embodiment, other than the effects (1)-(4) described in the first embodiment, the following effect can also be obtained.

(11) The presuming travel trajectory can be presumed by using the travel trajectory 41 of the preceding adjacent vehicle 40. In addition, the presuming travel trajectory can be presumed by using the road information such as the lanes, guard rail and side walls. At this time, the presuming travel trajectory is presumed by using a plurality of information, thus, the presuming accuracy can be improved.

Other Embodiments

In addition, the above embodiments can also be carried out by the following aspects.

In the above embodiment, a case is described in which the travel trajectory assistance is performed based on the target travel trajectory. At this time, if the signal of the steer amount for following the target travel trajectory from the steer assistance portion is displayed on the display device, the vehicle travels to follow the target travel trajectory by using the operations of the user. In addition, if the signal of the steer amount for following the target travel trajectory from the steer assistance portion is input to the acceleration control device, then the vehicle travels to automatically steer within a permitted range and follow the target travel trajectory.

The above first to fourth embodiments can be carried out by combining more than any two of the embodiments. In the above embodiment, a case is described in which the vehicle-mounted network is CAN. However, it is not limited to this, as long as the vehicle-mounted network can communicatively connect the connected ECU, the vehicle-mounted network can also be consisted of networks such as Ethernet (registered trademark), FlexRay (registered trademark), and IEEE1394 (FireWire (registered trademark)) etc. In addition, the vehicle-mounted network can also be configured by combining these networks, including CAN. Therefore, for the vehicle using the driving assistance device, the improvement of the freedom of the configuration can be achieved.

In the above embodiment, a case is described in which the vehicle-mounted control device 200 is consisted of one ECU. However, it is not limited to this; the vehicle-mounted control device can also realize its function by using the cooperating action of a plurality of ECUs. For example, the vehicle-mounted control device can also be consisted using the driving system, travelling system, vehicle body system, or information device system, etc. as the'plurality of ECUs as the control object. Therefore, the improvement of the freedom of the design of the driving assistance device can be achieved.

In the above embodiment, a case is described in which the navigation system 112, the display device 113, and the vehicle-mounted control device 200, etc. are integrally provided on the vehicle 10. However, it is not limited to this, as long as the navigation system, the display device, and the vehicle-mounted network can be communicatively connected, portable information process devices such as a mobile phone or a smart phone, etc. can be used for all of or a part of the above function. Therefore, the improvement of the freedom of the design of the driving assistance device can be achieved.

In the above third embodiment, a case is described in which the assistance that assists the host vehicle to move to a lane width direction opposite to the entering direction of the entering vehicle is ended when the travel trajectory 21 of the preceding vehicle 20 cannot be acquired and returning to the target travel trajectory 11. However, it is not limited to this, since the travel trajectory of the preceding vehicle is acquired, the object of the travel trajectory assistance may return to the target travel trajectory until the position where it is assumed that the travel trajectory of the preceding vehicle intersects with the travel trajectory of the entering vehicle. In addition, the assistance that assists the host vehicle to move to a lane width direction opposite to the entering direction of the entering vehicle may also be ended when the location determination portion determined that the deviation amount becomes the predetermined value or below.

Therefore, the travel distance caused by the target travel trajectory based on the offset value can be shortened. In the above third embodiment, a case is described in which the entering vehicle 30 enters the width occupied by the vehicle 10 is determined based on the event that the entering vehicle 30 enters the lane R3. However, it is not limited to this, it may also be determined that the entering vehicle enters the width occupied by the entering vehicle, based on the position where the travel trajectory of the preceding vehicle is difficult to be acquired by the host vehicle determined based on the width and height etc. of the entering vehicle. Therefore, the improvement of the convenience of the driving assistance device can be achieved.

In the above third embodiment, a case is described in which the offset value Hf is predetermined. However, it is not limited to this, the offset value Hf may also change according to the distance to the entering vehicle, and the speed of the vehicle, etc. For example, when the distance from the vehicle to the entering vehicle is short or the vehicle speed is high, the offset value may be large. Therefore, since the assistance that is capable of reducing the uncomfortable feeling of the users can be performed, the expansion of the application possibility of the driving assistance device can be achieved.

In the above fourth embodiment, a case is described in which the target travel trajectory is set according to the travel trajectory 41 of the adjacent vehicle 40. However, it is not limited to this; the target travel trajectory may also be set based on the area defined by the lanes of the road where the vehicle can travel, in which the area is a travel route. That is, the presuming travel trajectory may also be obtained based on at least one of the travel trajectory of the adjacent vehicle travelling in the lane adjacent to the lane where the vehicle travels, and the shape (straightness or curvature) of the travel route on which the vehicle travels. Moreover, in the above description, a case is illustrated in which the travel route is the lane of the road, but this can be replaced, for example, the travel route may be the area defined by the road facilities such as the lanes of the road, guard rails and side walls, etc., where the vehicle can travel. Therefore, the expansion of the situation under which the driving assistance device can be used is achieved.

In addition, the presuming travel trajectory can be obtained respectively based on the adjacent vehicle, lanes on the road, guard rails and side walls, and the deviation of them is used for reliability assessment evaluation, and the obtained presuming travel trajectory is not used for the driving assistance device when the deviation is large. Therefore, the maintenance of the accuracy of the driving assistance is achieved.

In the above embodiment, a case is described in which the setting of the presuming travel trajectory is changed from the travel trajectory 21 of the preceding vehicle 20 to the travel trajectory 31 of the entering vehicle 30, regardless of the deviation or angle between the travel trajectory 21 of the preceding vehicle 20 and the travel trajectory 31 of the entering vehicle 30. However, it is not limited to this; the travel trajectory of the preceding vehicle and the travel trajectory of the entering vehicle can also overlap such that these 2 trajectories are tangent with each other (the advancing azimuth angles are connected continuously). In addition, when there is an angle formed by the travel trajectory of the preceding vehicle and the travel trajectory of the entering vehicle, the cross section of these 2 travel trajectories may also connect in a curved way. Therefore, the uncomfortable feeling of the user brought by the driving assistance device can be further restrained.

In the second embodiment as above, a case that the travel trajectory 31 of the entering vehicle 30 is linearly approaching the travel trajectory 21 of the preceding vehicle 20 is described. However, it is not limited to this; the presuming travel trajectory may also be created based on the approaching ratio when the travel trajectory of the entering vehicle approaches the travel trajectory of the preceding vehicle in a manner of describing a sine wave. Therefore, the target travel trajectory can be created with a higher accuracy.

In the second embodiment as above, a case that the gradually changed ratio is constant is described. However, it is not limited to this, the gradually changed ratio may also be changed based on the trajectory until the travel trajectory of the preceding vehicle and the travel trajectory of the entering vehicle overlap, the inter-vehicle distance between the preceding vehicle and the entering vehicle, and the vehicle speeds of the preceding vehicle and the entering vehicle, etc. For example, the gradually changed ratio may be reduced when the inter-vehicle distance with respect to the preceding vehicle is large or the vehicle speed is high, so as to make the overlapping of the two travel trajectories smooth. Therefore, the uncomfortable feeling of the user can be further restrained.

In the above embodiment, a case is described in which the target trajectory setting portion 370 sets the target travel trajectory based on the travel trajectory 21 of the preceding vehicle 20, the travel trajectory 31 of the entering vehicle 30, or the presuming travel trajectory. However, it is not limited to this; the target travel trajectory on which the host vehicle should travel may also be set based on the preceding vehicle, the travel trajectory of the surrounding vehicle, and the road shape, etc. Therefore, the assistance accuracy of the driving assistance device can also be improved.

In the above embodiment, a case is described in which the "determination value Δh" is set as a parameter. However, it is not limited to this; the determination value may also be variable by calculating according to the vehicle speed, or referring to the tables. Therefore, the uncomfortable feelings of the user can be further restrained.

In the above embodiments, a case is described in which the preceding vehicle detection portion 310, the entering vehicle detection portion 320, the speed assistance portion 330, the preceding vehicle travel trajectory acquisition portion 340, the entering vehicle travel trajectory acquisition portion 350, the location determination portion 360, the target trajectory setting portion 370 and the steer assistance portion 380 are independently provided. However, it is not limited to this, the preceding vehicle detection portion, the entering vehicle detection portion, the speed assistance portion, the preceding vehicle travel trajectory acquisition portion, the entering vehicle travel trajectory acquisition portion, the location determination portion, the target trajectory setting portion and the steer assistance portion may also be provided by combining all of or a part of their functions, and may also be provided by sharing a part of their functions. For example, all of or a part of the preceding vehicle detection portion, the entering vehicle detection portion and the speed assistance portion may be combined, as the speed assistance portion (speed control portion) and the inter-vehicle distance assistance portion (inter-vehicle distance control portion). In addition, all of or a part of the preceding vehicle travel trajectory acquisition portion, the entering vehicle travel trajectory acquisition portion, the location determination portion, the target trajectory setting portion and the steer assistance portion may be combined, as the target trajectory setting portion and the travel trajectory assistance portion (travel trajectory control portion). Therefore, the improvement of the freedom of the configuration of the driving assistance device is achieved.

What is claimed is:

1. A driving assistance device, comprising:
a preceding vehicle detection portion that detects a preceding vehicle in front of a host vehicle in which the driving assistance device is disposed;
a speed control portion that controls a speed adjustment of the host vehicle to make an inter-vehicle distance between the host vehicle and the preceding vehicle become a target inter-vehicle distance;
a preceding vehicle travel trajectory acquisition portion that acquires a travel trajectory of the preceding vehicle;
an entering vehicle detection portion that detects an entering vehicle that enters between the host vehicle and the preceding vehicle;
an entering vehicle travel trajectory acquisition portion that acquires a travel trajectory of the entering vehicle detected by the entering vehicle detection portion;
a target trajectory setting portion that sets a target travel trajectory of the host vehicle based on at least one of the travel trajectory of the preceding vehicle or the travel trajectory of the entering vehicle;
a steering control portion that controls an adjustment of a steer amount of the host vehicle based on the target travel trajectory; and
a location determination portion that determines a location where a deviation amount between the travel trajectory of the entering vehicle and the travel trajectory of the preceding vehicle becomes a predetermined value or below,
wherein the speed control portion is configured to set the entering vehicle as the preceding vehicle of the speed control portion when the entering vehicle is detected by the entering vehicle detection portion, and
wherein the target trajectory setting portion is configured to set the target travel trajectory of the host vehicle based on the travel trajectory of the preceding vehicle before entering of the entering vehicle at least until reaching the location determined by the location determination portion after the speed control portion sets the entering vehicle as the preceding vehicle, and sets the target travel trajectory of the host vehicle based on the travel trajectory of the entering vehicle after the location determined by the location determination portion.

2. The driving assistance device according to claim 1, wherein
the entering vehicle detection portion is configured to detect the entering vehicle, at least based on an event that an interval between the target travel trajectory of the host vehicle and a vehicle body of the entering vehicle in a direction perpendicular to a travel direction of the host vehicle becomes a predetermined interval or below, and
the predetermined value is a value smaller than the predetermined interval in the direction perpendicular to the travel direction of the host vehicle.

3. The driving assistance device according to claim 1, wherein
the location determination portion is configured to obtain the deviation amount as a distance in a straight line which intersects with the travel trajectory of the preceding vehicle and the travel trajectory of the entering vehicle.

4. The driving assistance device according to claim 3, wherein
the location determination portion uses the intersecting straight line that is perpendicular to any one of the travel trajectory of the preceding vehicle and the travel trajectory of the entering vehicle.

5. The driving assistance device according to claim 1, further comprising a travel trajectory presuming portion that obtains a presuming travel trajectory that is presumed as the travel trajectory of the preceding vehicle,
wherein the location determination portion uses the presuming travel trajectory of the preceding vehicle as the travel trajectory of the preceding vehicle further after the location where the travel trajectory of the preceding vehicle cannot be acquired.

6. The driving assistance device according to claim 5, wherein
the travel trajectory presuming portion is configured to obtain the travel trajectory approaching ratio of the travel trajectory of the entering vehicle with respect to the travel trajectory that can be acquired as the travel trajectory of the preceding vehicle, and obtains the presuming travel trajectory based on the obtained approaching ratio and the travel trajectory of the entering vehicle.

7. The driving assistance device according to claim 6, wherein
the travel trajectory presuming portion is configured to obtain a distance from the travel trajectory of the preceding vehicle and the travel trajectory of the entering vehicle as an inter-trajectory distance at a position where the travel trajectory of the preceding vehicle is acquired, and calculates the presuming travel trajectory by reducing the obtained inter-trajectory distance based on the approaching ratio of the travel trajectory of the entering vehicle.

8. The driving assistance device according to claim 5, wherein
the travel trajectory presuming portion is configured to obtain the presuming travel trajectory based on at least one of the travel trajectory of an adjacent vehicle travels on a lane adjacent to the lane where the host vehicle travels, or a shape of a travel route where the host vehicle travels.

9. The driving assistance device according to claim 1, wherein
the steering control portion is configured to assist the host vehicle to move to a lane width direction opposite to an entering direction of the entering vehicle when it is determined that it is difficult to acquire the travel trajectory of the preceding vehicle due to an effect of the entering vehicle.

10. The driving assistance device according to claim 9, wherein
the steering control portion is configured to determine that it is difficult to acquire the travel trajectory of the preceding vehicle due to the effect of the entering vehicle when the entering vehicle enters the width occupied by the host vehicle when travelling in a direction perpendicular to a travel direction of the host vehicle.

11. The driving assistance device according to claim 9, wherein
the steering control portion is configured to end assisting the host vehicle to move to the lane width direction opposite to the entering direction of the entering vehicle when the location determination portion determines the location where the deviation amount becomes the predetermined value or below.

12. A driving assistance device, comprising:
a preceding vehicle detection portion that detects a preceding vehicle in front of a host vehicle in which the driving assistance device is disposed;
a speed control portion that controls a speed adjustment of the host vehicle to make an inter-vehicle distance between the host vehicle and the preceding vehicle becomes a target inter-vehicle distance;
a preceding vehicle travel trajectory acquisition portion that acquires a travel trajectory of the preceding vehicle;
an entering vehicle detection portion that detects an entering vehicle which enters between the host vehicle and the preceding vehicle;
an entering vehicle travel trajectory acquisition portion that acquires a travel trajectory of the entering vehicle detected by the entering vehicle detection portion;
a target trajectory setting portion that sets a target travel trajectory of the host vehicle based on at least one of the travel trajectory of the preceding vehicle or the travel trajectory of the entering vehicle;
a steering control portion that controls an adjustment of a steer amount of the host vehicle based on the target travel trajectory; and
a location determination portion that determines a location where a deviation amount between the travel trajectory of the entering vehicle and the travel trajectory of the preceding vehicle becomes a predetermined value or below,
wherein the speed control portion is configured to set the entering vehicle as the preceding vehicle of the speed control portion when the entering vehicle is detected by the entering vehicle detection portion,
wherein the location determination portion is configured to set a value smaller than the deviation amount between the travel trajectory of the entering vehicle and the travel trajectory of the preceding vehicle at the location where the speed control portion sets the entering vehicle as the preceding vehicle as the predetermined value, and
wherein the target trajectory setting portion is configured to set the target travel trajectory of the host vehicle based on the travel trajectory of the preceding vehicle before entering of the entering vehicle until reaching the location determined by the location determination portion, and sets the target travel trajectory of the host vehicle based on the travel trajectory of the entering vehicle after the location determined by the location determination portion.

13. A driving assistance device that performs a driving assistance of a host vehicle in which the driving assistance device is disposed based on a travelling state of other vehicle detected at surroundings of the host vehicle, comprising:
a speed control portion configured to set any one of a preceding vehicle which travels in front of the host vehicle, and an entering vehicle which enters between the host vehicle and the preceding vehicle as an adjustment object vehicle, and controls a speed adjustment of the host vehicle, to make an inter-vehicle distance between the set adjustment object vehicle and the host vehicle become a predetermined distance;
a target trajectory setting portion configured to acquire a travel trajectory of the preceding vehicle and the travel trajectory of the entering vehicle respectively, sets any one travel trajectory of the acquired travel trajectories as an object trajectory, and sets a target travel trajectory as the travel target of the host vehicle based on the set object trajectory;
a steering control portion configured to control an adjustment of a steer amount of the host vehicle based on the target travel trajectory set by the target trajectory setting portion; and
a location determination portion that determines a location where a deviation amount between the travel trajectory of the entering vehicle and the travel trajectory of the preceding vehicle becomes a predetermined value or below,
wherein the target trajectory setting portion is configured to take an event of setting the adjustment object vehicle as the entering vehicle and an event of setting the object trajectory as the travel trajectory of the preceding vehicle as conditions, and switches the setting of the object trajectory from the travel trajectory of the preceding vehicle to the travel trajectory of the entering vehicle at the location determined by the location determination portion.

14. The driving assistance device according to claim 13, wherein
the speed control portion is configured to switch the adjustment object vehicle from the preceding vehicle to the entering vehicle, at least based on an event that an interval between the target travel trajectory of the host vehicle and a vehicle body of the entering vehicle in a direction perpendicular to a travel direction of the host vehicle becomes a predetermined interval or below, and
the predetermined value is a value smaller than the predetermined interval in a direction perpendicular to the travel direction of the host vehicle.

\* \* \* \* \*